United States Patent
Yun

(10) Patent No.: US 11,625,039 B2
(45) Date of Patent: Apr. 11, 2023

(54) MOVING ROBOT AND CONTROL METHOD THEREOF

(71) Applicant: LG ELECTRONICS INC., Seoul (KR)

(72) Inventor: Hyungtae Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 438 days.

(21) Appl. No.: 16/943,122

(22) Filed: Jul. 30, 2020

(65) Prior Publication Data

US 2021/0034061 A1 Feb. 4, 2021

(30) Foreign Application Priority Data

Jul. 31, 2019 (KR) .................. 10-2019-0093471

(51) Int. Cl.
*G05D 1/02* (2020.01)
*A47L 11/40* (2006.01)
*A47L 11/282* (2006.01)

(52) U.S. Cl.
CPC .......... *G05D 1/0214* (2013.01); *A47L 11/282* (2013.01); *A47L 11/4011* (2013.01); *A47L 11/4038* (2013.01); *A47L 11/4061* (2013.01); *A47L 11/4066* (2013.01); *A47L 11/4069* (2013.01); *A47L 11/4088* (2013.01); *A47L 2201/04* (2013.01); *A47L 2201/06* (2013.01); *G05D 2201/0203* (2013.01)

(58) Field of Classification Search
CPC .......... G05D 1/0214; G05D 2201/0203; A47L 11/4011; A47L 11/4038; A47L 11/4061; A47L 11/4066; A47L 11/4069; A47L 11/4088; A47L 2201/04; A47L 2201/06; A47L 9/2889; A47L 2201/00
USPC .............................................. 15/98
See application file for complete search history.

(56) References Cited

U.S. PATENT DOCUMENTS

2019/0038101 A1 2/2019 Jang et al.
2019/0038106 A1* 2/2019 Jang ................ A47L 11/4041

FOREIGN PATENT DOCUMENTS

| CN | 104918529 A | 9/2015 |
|---|---|---|
| CN | 105725911 A | 7/2016 |
| CN | 206403708 U | 8/2017 |
| CN | 107167315 A | 9/2017 |
| JP | 2004-318721 | 11/2004 |
| KR | 10-2009-0069595 | 7/2009 |
| KR | 10-2009-0104418 | 10/2009 |
| KR | 10-2011-0047505 | 5/2011 |
| KR | 10-2016-0090567 A | 8/2016 |

(Continued)

OTHER PUBLICATIONS

PCT International Search Report for Application No. PCT/KR2020/010131, dated Jan. 5, 2021 (3 pages).

*Primary Examiner* — Don M Anderson
*Assistant Examiner* — Caleb Andrew Holizna
(74) *Attorney, Agent, or Firm* — Birch, Stewart, Kolasch & Birch, LLP

(57) ABSTRACT

A mobile robot is configured to move a main body and rotate a cleaning cloth by means of a motor to clean a surface. A location change of the main body is analyzed to determine a traveling state of the robot. The absence of the cleaning cloth is detected and the operation of the robot is controlled based on the detected travelling state. A user is notified about the absence of the cleaning cloth.

20 Claims, 7 Drawing Sheets

(56) References Cited

FOREIGN PATENT DOCUMENTS

| | | |
|---|---|---|
| KR | 10-2018-0134683 A | 12/2018 |
| KR | 10-2019-0088691 | 7/2019 |
| RU | 2 593 113 C2 | 7/2016 |
| RU | 2 620 236 C1 | 5/2017 |

* cited by examiner

MOVING ROBOT AND CONTROL METHOD THEREOF

CROSS-REFERENCE TO RELATED APPLICATION

This application claims priority under 35 USC § 119 to Korean Application No. 10-2019-0093471, filed on Jul. 31, 2019, whose entire disclosure is hereby incorporated by reference.

BACKGROUND

The present disclosure relates to a moving robot and a control method thereof, and, more particularly, a moving robot capable of cleaning a floor surface based on rotation of a cleaning cloth while traveling an area, and a control method thereof.

In general, a moving robot travels itself within an area to perform a designated operation. For example, a cleaning robot automatically cleans by suctioning foreign substances such as dust from a floor surface. In addition, a lawn mower robot mows lawn while traveling in the area, and a wet cleaning robot cleans a floor surface using a cleaning cloth. In some cases, foreign substances are suctioned from the front of the moving robot, and a cleaning cloth is installed at the rear of the moving robot to perform dry and wet cleaning. Among these moving robots, a wet cleaning robot moves in an area while wiping a floor surface to perform wet cleaning.

Korea Patent Application Publication No. 10-2014-0015069 relates to a wet cloth cleaning robot which can precisely and quickly perform wet cleaning with a wet cloth by a means of a wetting and wiping step, wherein a water tank is formed in a cleaning cloth plate, and a wet cloth has a water coated part and a water wiping part so that cleaning can be performed with the wet cloth by means of the wetting and wiping step. Since the robot cleaner has low friction with the floor surface because a predetermined pressure does not act on the floor surface, foreign substances are not effectively removed, and thus cleaning cannot be performed efficiently.

Meanwhile, Korea Patent Application Publication No. 2019-007608 relates to a robot cleaner, which includes first and second rotating members and first and second rotational shafts for rotating each rotating member, thereby enabling the robot cleaner to move based on rotation of the rotating members. The robot cleaner has a cleaner (or a wet cloth) attached thereto and performs wet cleaning on a floor surface while moving in an area. However, when this robot operates without the cleaner attached, the user may not recognize the absence of the cleaner because the cleaner is generally attached to the bottom of the robot cleaner, that is, the bottom surface. When the robot cleaner moves with the cleaning cloth or cleaner not attached, cleaning may not be properly performed.

In addition, since the rotating member of the robot moves while rotating, the rotating member or other components (or the floor surface) may be damaged due to increased friction. In addition, friction between the robot and the floor surface may damage the floor surface and may cause the material of the floor surface to be changed. In addition, if water is supplied while the wet cloth or the cleaner is not attached, a certain amount of water may accumulate on the floor surface, which may cause accidents such as slipping.

SUMMARY

An aspect of the present disclosure provides a moving robot and a control method thereof for operating a main body while rotating a cleaning cloth by means of a motor, thereby performing wet cleaning on a floor surface with an increased friction.

Another aspect of the present disclosure provides a moving robot and a control method thereof for detecting the installation or absence of a cleaning cloth, outputting a notification, and stopping an operation to prevent a damage to a product and a floor surface.

Another aspect of the present disclosure provides a moving robot and a control method thereof for analyzing a location change of a main body to detect the absence of a cleaning cloth.

Another aspect of the present disclosure provides a moving robot and a control method thereof for preventing water supplied to the cleaning cloth from accumulating on a floor surface.

Another aspect of the present disclosure provides a moving robot and a control method thereof for allowing a user to recognize the absence of a cleaning cloth in a short time.

The objects of the present invention are not limited to the above-mentioned objects, and other objects that are not mentioned will be clearly understood by those skilled in the art from the following description.

In order to achieve the above objects, a moving robot and a control method thereof according to the present disclosure moves a main body based on rotation of a cleaning cloth by means of a motor and cleans a floor surface with the rotation of the cleaning cloth.

In the present disclosure, when moving in response to rotation of the cleaning cloth, a location change may be analyzed to detect whether the cleaning cloth is attached.

In the present disclosure, whether or not the cleaning cloth is attached may be detected based on a change in a traveling distance and a rotation angle of the main body.

In the present disclosure, installation of only part of the cleaning cloth may be detected.

In the present disclosure, once cleaning starts, a traveling state may be analyzed to determine the absence of the cleaning cloth or the number of installed cleaning cloths.

In the present disclosure, whether the cleaning cloth is attached may be determined based on a traveling state when it is not possible to travel, when it is not possible to travel straight forward, when in-place rotation in a circular form occurs, and when there is only a change in a rotation angle while a straight travelled distance is not calculated.

In the present disclosure, a notification may be output by detecting whether a cleaning cloth is attached.

In the present disclosure, an operation may be stopped when the cleaning cloth is not attached.

The present disclosure is a main body for driving the area; a first rotary plate on which the first cleaning cloth is installed, and a rotating map including a second rotary plate on which the second cleaning cloth is installed; a cleaner that moves the main body while removing foreign substances on the bottom surface by the rotating operation of the spin mop; When driving, the controller outputs a warning by determining a driving condition by calculating a location change of the main body, and determining whether a cleaning cloth is attached to the first or second rotary plate according to the driving condition of the main body.

The controller is characterized in that if there is no location change in the main body for a certain period of time, it is determined that the first cleaning cloth and the second cleaning cloth are not installed.

When the rotation angle is changed while moving within a predetermined range for a predetermined period of time, the controller is characterized in that it is determined that any one of the first cleaning cloth and the second cleaning cloth is not installed.

The controller is characterized in that it determines the location change of the main body by calculating the movement distance and rotation angle for the x-axis and y-axis based on the start point as a coordinate value.

When the change of the coordinate values for the x-axis, the y-axis, and the rotation angle is repeated according to a certain pattern, the controller determines that there is an abnormality in driving of the main body.

The present disclosure further includes an obstacle detector that detects an obstacle in the driving direction, and the controller determines whether the traveling state of the main body is abnormal due to an obstacle according to the detection result of the obstacle detector.

The cleaner may include a plurality of motors configured to transmit a rotational force to the spin mop; a driving unit configured to control the plurality of motors so that the first rotary plate and the second rotary plate are rotated independently; and a water supply unit configured to supply water to the cleaning cloth, and the driving unit may be configured to when there is an abnormality in installation of the cleaning cloth, stop operation of the motor according to a control command from the controller and stop water supply to the cleaner from the water supply unit.

According to an aspect of the present disclosure, there is provided a control method of a moving robot, the method including: spinning by a spin mop comprising a first rotary plate and a second rotary plate, wherein a first cleaning cloth is installed at the first rotary plate and a second cleaning cloth is installed at the second rotary plate; traveling by a main body in response to rotation of the spin mop while the first cleaning cloth and the second cleaning cloth removes foreign substances from a floor surface; calculating a location of the main body; determining a traveling state of the main body according to a change in the location of the main body; when there is an abnormality in traveling of the main body, determine whether the first rotary plate or the second rotary plate has a corresponding cleaning cloth installed thereto; and when there is an abnormality in installation of the corresponding cleaning cloth, output a warning.

The method may further include: when there is no change in the location of the main body for a predetermined period of time, determining that the first cleaning cloth and the second cleaning cloth are not installed; and when a rotation angle is changed during movement within a predetermined range for a predetermined period of time, determining that any one of the first cleaning cloth and the second cleaning cloth is not installed.

The method may further include: when it is determined that there is an abnormality in installation of the cleaning cloth, stopping rotation of the first rotary plate and the second rotary plate; stopping water supply to the cleaning cloth.

The method may further include: detecting an obstacle in a direction of travel; and when a traveling state of the main body is abnormal due to the obstacle, performing a motion responsive to the obstacle.

In a moving robot and a control method thereof according to the present disclosure, as whether a cleaning cloth for wet cleaning is detected and a user is allowed to recognize the detection, it is possible to confirm an abnormality in a main body and perform wet cleaning efficiently.

In the present disclosure, it is possible to move in an area in response to rotation of an installation part where a cleaning cloth is attached, and to increase a friction against a floor surface to effectively remove foreign substances, thereby improving cleaning efficiency.

In the present disclosure, it is possible to solve a problem of traveling of the main body by classifying a traveling state caused by the absence of the cleaning cloth and a traveling state caused by the presence of an obstacle.

In the present disclosure, once the moving robot starts operating, whether a cleaning cloth is attached is detected and then a notification is output and an operation is stopped, and therefore, it is possible for a user to recognize the absence of the cleaning cloth.

In the present disclosure, it is possible to solve the problem that a radius of movement of the moving robot is limited and the moving robot is not allowed to travel straight forward due to the absence of a cleaning cloth.

In the present disclosure, it is possible to detect whether or not the cleaning cloth is installed based on a location change of the main body even though an additional sensor is not attached.

In the present disclosure, as rotation of an installation part where a cleaning cloth is to be attached is utilized, it is possible to prevent a damage to a product due to a friction that is increased when the cleaning cloth is not installed.

In the present disclosure, as rotation of an installation part where a cleaning cloth is to be attached is utilized, it is possible to prevent a damage to a floor surface due to a friction that is increased when the cleaning cloth is not installed.

In the present disclosure, it is possible to prevent water supplied to the cleaning cloth from accumulating on the floor and to preventing a safety accident due to the accumulated water.

DESCRIPTION OF EXEMPLARY EMBODIMENTS

Advantages and features of the present invention and a method of achieving the same will be clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. Throughout the specification, like numbers refer to like elements. A control configuration of the present disclosure may be composed of at least one processor.

Figure 1:
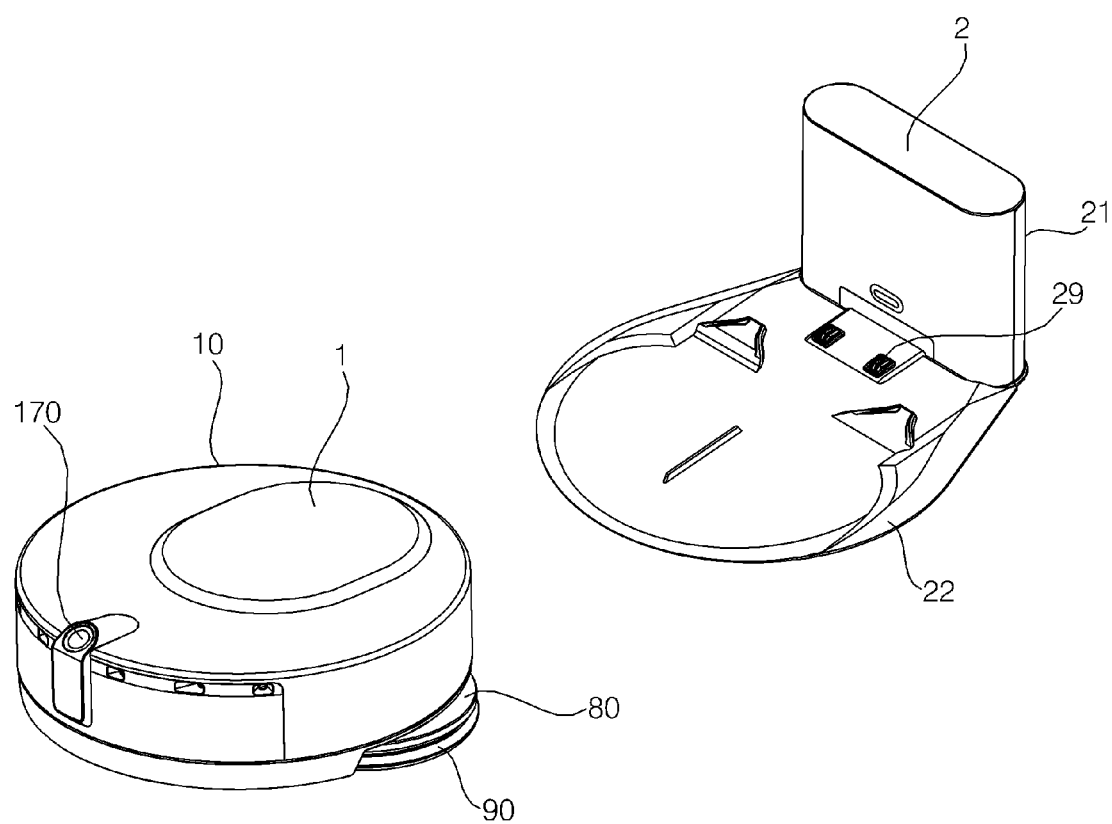
FIG. 1 is a perspective view illustrating a moving robot according to an embodiment of the present disclosure.
Figure 2A:
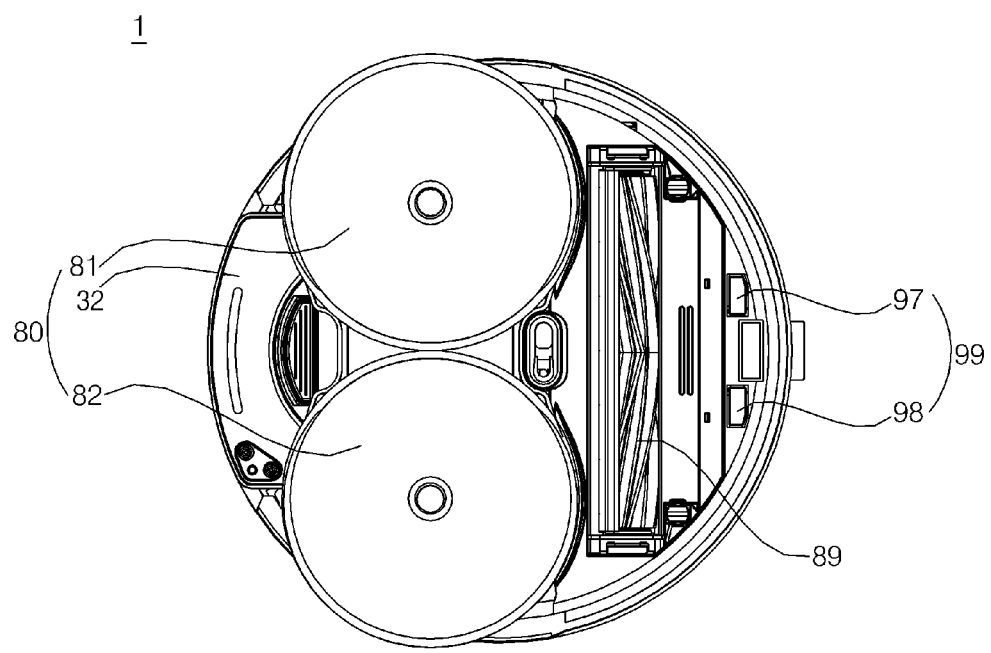
FIGS. 2(a) and 2(b) show a bottom surface of a moving robot according to an embodiment of the present disclosure.
Figure 2B:
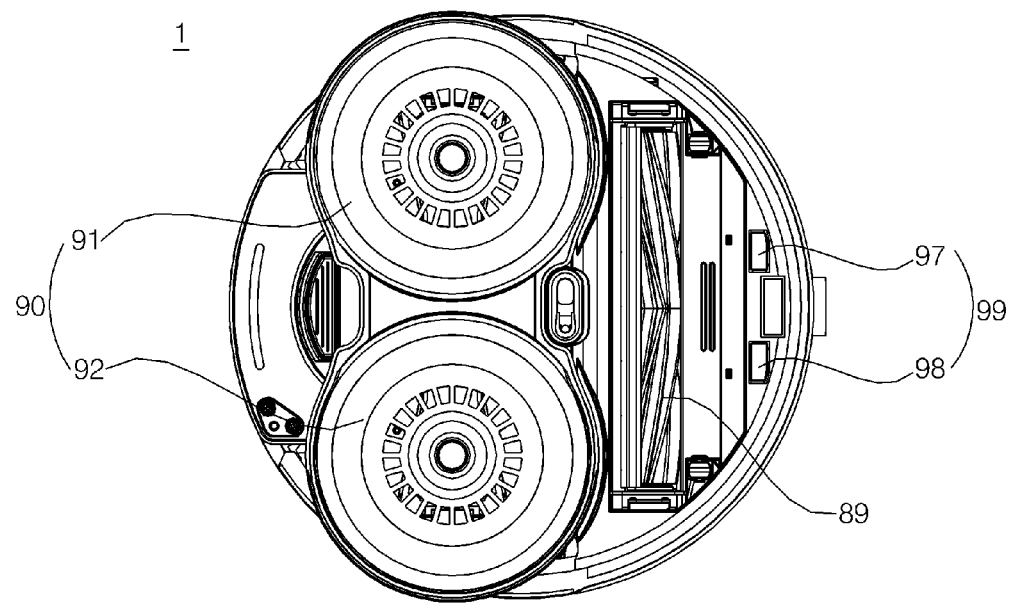

FIG. 1 is a perspective view illustrating a moving robot (or a mobile robot) according to an embodiment of the present disclosure, and FIGS. 2(a) and 2(b) illustrate a bottom surface of a moving robot according to an embodiment of the present disclosure.

Referring to FIGS. 1, 2(a) and 2(b), a moving robot 1 according to an embodiment of the present disclosure moves within an area and removes foreign substances from a floor or another surface in the area during traveling.

In addition, the moving robot 1 stores charged power, supplied from a charging stand 2, in a battery (not shown) to travel an area.

The moving robot 1 includes a main body 10 for performing a designated operation, an obstacle detector (not shown) disposed at a front surface of the main body 10 to sense an obstacle, and an image acquirer 170 for capturing an image. The main body 10 includes a casing which forms a space to accommodate components of the main body 10, which forms an exterior of the main body and an interior space to accommodate components of the main body 10; a spin mop 80 capable of rotating, a roller 89 for assisting movement of the main body 10 and cleaning, and a charging terminal 99 through which charging power is received from the charging stand 2.

In addition, the moving robot 1 may further include a water tank 32 disposed inside the main body 10 to store water, a pump (not shown) for supplying water stored in the water tank to the spin mop 80, and a connecting hose (not shown) that forms a connecting flow path between the pump and the water tank 32 or between the pump and the spin mop 80. In some cases, a valve for controlling water supply may be further provided.

The spin mop 80 is disposed at the casing and is formed toward a bottom surface so that the cleaning cloth is detachable. The spin mop is symmetrically disposed at a lower side of the main body 10. The spin mop 80 is disposed in front of the water tank 32.

The spin mop 80 moves using a frictional force with the bottom surface, the frictional force which is generated in response to rotation in a clockwise or counterclockwise direction as viewed from above, and the spin mop cleans a floor. The spin mop 80 is provided to rotate around a rotational axis that extends in a substantially vertical direction.

The spin mop 80 includes a first rotary plate 81 and a second rotary plate 82 so that the body 10 moves along a floor of an area through rotation.

The main body 10 travels forward, backward, leftward, and rightward as the first and second rotary plates 81 and 82 of the spin mop 80 rotate around the rotational axis. In addition, as the first rotary plate and the second rotary plate rotate, foreign substances are removed from a bottom surface by an attached cleaning cloth and the main body 10 performs perform wet cleaning.

The main body 10 may include a driving unit (not shown) for driving the first rotary plate 81 and the second rotary plate 82. The driving unit may include at least one motor.

Lower surfaces of the spin mop 80 may be arranged to be inclined, respectively. A lower surface of the first rotary plate 81 forms a slope downward in the left direction as a whole. A lower surface of the second rotary plate 82 forms a slope downward in the right direction as a whole. The lower surface of the first rotary plate 81 forms the lowest point on the left side. The lower surface of the first rotary plate 81 forms the highest point on the right side. The lower surface of the second rotary plate 82 forms the lowest point on the right side. The lower surface of the second rotary plate 82 forms the highest point on the left side. For example, as the first rotary plate 81 rotates at a first rotational speed in a first direction and the second rotary plate 82 rotates at the first rotational speed in a second direction, the main body 10 may move forward and backward. In addition, the main body 10 may move leftward and rightward by setting different rotational speeds for the first and second rotary plates or by setting the same rotational direction for the first and second rotary plates.

In addition, the main body 10 may further include a tilting frame (not shown). The tilting frame is disposed to be tiltable within a predetermined angular range with respect to the spin mop 80. The tilting frame allows a tilt angle to be changed according to a floor condition. The tilting frame may perform the function of suspension (reducing up and down vibration at the same time as supporting the weight) of the spin mop 80. The roller 89 rotates during traveling, and collects foreign substances from the bottom surface and stores the collected foreign substances in a dust container (not shown).

A control panel including an operator (not shown) that receives various commands for controlling the moving robot 1 from a user may be provided on an upper surface of the casing. In addition, an image acquirer 170 and an obstacle detector (not shown) are disposed at a front surface or an upper surface of the main body. The obstacle detector senses an obstacle located in a direction of travel or around the main body 10. The image acquirer 170 captures an image of an indoor area. Based on the image captured through the image acquirer, it is possible not just to sense an obstacle around the main body but also to monitor the indoor area. The image acquirer 170 is disposed at a predetermined angle toward a forward and upward direction to photograph an area forward and upward from the moving robot. In addition, the image acquirer is capable of 360-degree photographing.

The image acquirer may further include an additional camera for photographing a front area. The image acquirer may be disposed at an upper side of the main body 10 to face the ceiling, and in some cases, a plurality of cameras may be provided. In addition, the image acquirer may further include an additional camera for photographing a bottom surface.

The moving robot 1 may further include a location obtaining means (not shown) for obtaining current location information. In some embodiments, the moving robot 1 may determine the current location by including a GPS and/or a UWB. Additionally or alternatively, the moving robot 1 may determine the current location using an image.

The main body 10 may include a rechargeable battery (not shown), and as the charging terminal 99 of the battery may be connected to a utility power source (for example, a power outlet at home) or the main body 10 is docked with the charging stand 2 connected to the utility power source, the charging terminal may be electrically connected to the utility power source through contact with a terminal 29 of the charging stand, so that the battery can be charged by the charging power being supplied to the main body 10.

The electric components constituting the moving robot 1 may be supplied with power from the battery, and thus, in the state in which the battery is charged, the moving robot 1 is capable of traveling by itself while being electrically disconnected from the utility power source.

Hereinafter, the moving robot 1 will be described with an example of a moving robot for wet cleaning, but the present disclosure is not limited thereto, and aspects of the current disclosure may be applied to any type of robot without limitation. For example, the disclosed robot may be capable of sensing sound while autonomously traveling an area.

The spin mop 80 includes the first rotary plate 81 and the second rotary plate 82. Cleaning cloths 91 and 92 and 90 may be attached to the first rotary plate 81 and the second rotary plate 82, respectively. The spin mop 80 is configured such that the cleaning cloths can be detachably attached. The spin mop 80 may include mounting members for attaching the cleaning cloths to the first rotary plate 81 and the second rotary plate 82, respectively. For example, a mounting member, such as Velcro® and/or a fitting member, may be provided in the spin mop 80 so that a cleaning cloth is attached and fixed. Additionally or alternatively, the spin mop 80 may further include a cleaning cloth frame (not shown) as an additional auxiliary means for fixing the cleaning cloths to the first rotary plate 81 and the second rotary plate 82.

The cleaning cloth 90 absorbs water and removes foreign substances through friction with the bottom surface (e.g., floor on which robot operates). The cleaning cloth 90 may be made of a microfiber or fabric pad, and a material such as cotton fabric or blended cotton fabric may be used. Without limitation, any type of cleaning cloth can be used. In some embodiments, the cleaning cloth may contain moisture at a certain proportion or more and/or may have a predetermined fabric density.

The cleaning cloth 90 is supplied with water from the water tank 32 through the connecting flow path. Water may be supplied from the water tank 32 to the cleaning cloth 90 through the connection passage through the driving of the pump. In some embodiments, the cleaning cloth 90 is formed in a circular shape. The shape of the cleaning cloth 90 is not limited to the drawings and may be formed in a square, a polygon, or the like, but it is preferable that the cleaning cloth has a shape that does not interfere with rotation of the first and second rotary plates by taking into account the rotation of the first and second rotary plates. In addition, the shape of the cleaning cloth may be changed into a circle by the cleaning cloth frame that is provided separately.

The spin mop 80 is configured such that once the cleaning cloth 90 is installed, the cleaning cloth comes into contact with the bottom surface. The spin mop 80 is configured in consideration of a thickness of the cleaning cloth such that a distance between the first rotary plate and the second rotary plate is changed according to the thickness of the cleaning cloth.

The spin mop 80 further includes a member which adjusts a distance between the casing and a rotary plate so that the cleaning cloth and the bottom surface come into contact with each other, and which causes pressure to be applied on the first and second rotary plates toward the bottom surface.

Figure 3:
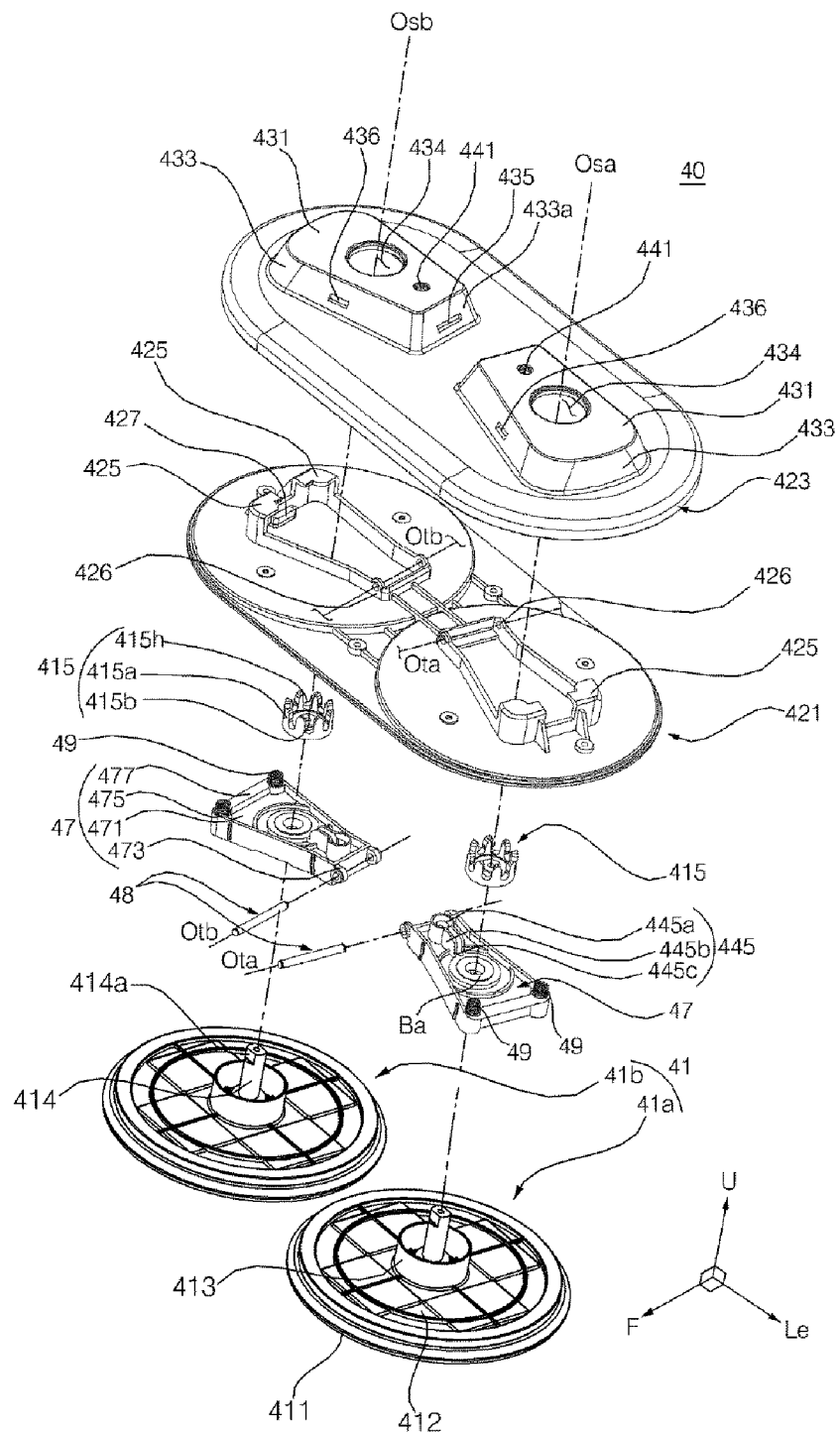
FIG. 3 is an exploded perspective view of a mop module including a spin mop of the moving robot of FIGS. 2(a) and 2(b).

FIG. 3 is an exploded perspective view of a mop module including a spin mop of the moving robot of FIG. 2. As shown in FIG. 3, the spin mop 80 is included in a mop module 40. The mop module 40 includes at least one cleaning cloth 90, 41, 411 provided to mop the bottom surface while rotating, and at least one spin mop 80 provided to come in contact with the bottom while rotating in a clockwise direction or in a counter-clockwise direction as viewed from above. The spin mop includes a first rotary plate 81, 41$a$ and a second rotary plate 82, 41$b$. In this embodiment, the spin mop 80 is provided to rotate about a rotational axis Osa, Osb that extends in a substantially vertical direction.

The mop module 40 is disposed below the main body 10. The mop module 40 is disposed behind a collecting module. A first rotary plate 41$a$ and a second rotary plate 41$b$ each include a cleaning cloth 411, a rotary plate 412, and a spin shaft 414. The first rotary plate 41$a$ and the second rotary plate 41$b$ each include a water supply receiving unit 413. The first rotary plate 41$a$ and the second rotary plate 41$b$ each include a driven joint 415. The cleaning cloth 411, the rotary plate 412, a spin shaft 414, the water receiving portion 413, and the driven joint 415, which will be described later, may be understood as components included in each of the first rotary plate 41$a$ and the second rotary plate 41$b$.

The main body 10 and the mop module 40 may be detachably coupled to each other. The state in which the main body 10 and the mop module 40 are coupled to each other may be referred to as a "coupled state." In addition, the state in which the main body 10 and the mop module 40 are separated from each other may be referred to as a "separated state." The moving robot 1 includes a detachment module (not shown) that detachably engages the mop module with the main body. The detachment module may disengage the mop module 40 from the main body 10 in the coupled state. The detachment module operates such that the mop module 40 and the main body 10 are detached from and attached to each other. The detachment module may cause the main module 10 to be engaged with the main module 10 in the separated state. The detachment module may be disposed across a gap between the water tank 32 and a battery Bt.

The moving robot 1 includes a base (not shown) that forms a lower surface of the main body 10. The base forms the lower surface, the front surface, the rear surface, the left surface, and the right surface of the main body 10. The mop module 40 is coupled to the base. The collecting module (not shown) is coupled to the base. The controller 110 and the battery Bt are disposed in an inner space formed by the case 31 and the base.

The moving robot 1 includes a module housing 42 that forms the exterior of the mop module 40. The module housing 42 is disposed below the body 10. The mop module 40 includes a pair of main body seating portions (not shown) that are spaced apart from each other. The pair of main body seating portions corresponds to a pair of spin mops 41$a$ and 41$b$. The pair of main body seating portions correspond to a pair of module seating portions (not shown).

A module seating portion forms a joint hole (not shown) in which at least a portion of a driving joint (not shown) is exposed. The driving joint (not shown) may be placed by passing through the joint hole. The driving joint is coupled to the driven joint 415 to transmit a driving force of the driving unit (not shown) to the spin mop.

A surface of one of the module seating portion and the body seating portion is provided with a protruding engaging portion (not shown), and a surface of the other is provided with an engaged portion 435, 436 that is recessed to engage with the engaging portion in the coupled state.

The main body seating portion 43 includes a top part 431 forming a top surface. The top part 431 faces upward. The top part 431 may be formed horizontally. The top part 431 is disposed above a peripheral part 433.

The main body seating portion 43 includes the peripheral part 433 that is disposed along a circumference of the top part 431. The peripheral part 433 forms a slope that extends between the top surface of the module housing 42 and the top part 431. The peripheral part 433 has an inclination that increases from the top surface of the module housing 42 to the top part 431. The peripheral part 433 is disposed surrounding the top part 431.

The main body seating portion 43 includes an engaged surface 433a that contacts an engaging surface 363a in the coupled state. The pair of main body seating portions 43 includes a pair of engaged surfaces 433a. The pair of engaged surfaces 433a are disposed in the left and right sides to obliquely face each other. The pair of engaged surface 433a is disposed between the pair of main body seating portions 43. An engaged surface 433a is disposed in an area of the periphery part 433 of one main body seating portion 43, the area which is close to the other main body seating portion 43. The engaged surface 433a is disposed in an area relatively close to a central vertical plane Po in the peripheral part 433. The engaged surface 433a constitutes a portion of the peripheral part 433.

The main body seating portion 43 has a driving hole 434 formed therein, the hole through which at least a portion of the driven joint 415 is exposed. The driving hole 434 is formed in the top part 431. In the coupled state, the driving joint may be inserted into the driving hole 434 and connected to the driven joint 415.

The mop module 40 includes at least one spin mop 80. The at least one spin mop 80 may include a pair of spin mops 80. The pair of spin mops 80 is provided symmetrically left and right with respect to a virtual central vertical plane. The first rotary plate 41a and the second rotary plate 41b are disposed symmetrically to each other.

The lower surface of the first rotary plate 41a and the lower surface of the second rotary plate 41b are disposed to be inclined, respectively. In some embodiments, the lower surface of the first rotary plate 41a forms a slope that is downward in the left direction as a whole. In some embodiments, the lower surface of the second rotary plate 41b forms a slope that is downward in the right direction as a whole.

The lower surface of the first rotary plate 41a forms the lowest point on the left side. The lower surface of the first rotary plate 41a forms the highest point on the right side. The lower surface of the second rotary plate 41b forms the lowest point on the right side. The lower surface of the second rotary plate 41b forms the highest point on the left side.

Movement of the moving robot 1 is performed by a friction with the ground, which is generated by the mop module 40. The mop module 40 may generate a "forward moving friction" to move the main body 10 forward, or a "rearward moving friction" to move the main body rearward. The mop module 40 may generate a "left moment friction" to rotate the main body 10 to the left, or a "right moment friction" to rotate the main body 10 to the right. The mop module 40 may generate a friction by combining any one of the forward movement friction and the rear movement friction and any one of the left moment friction and the right moment friction.

In order to generate the forward moving frictional force, the mop module 40 may rotate the first rotary plate 41a at a predetermined rpm R1 in a first forward direction and the second rotary plate 41b at the predetermined rpm R1 in a second forward direction.

In order to generate the rearward moving friction, the mop module 40 may rotate the first rotary plate 41a at a predetermined rpm in a first reverse direction and rotates the second rotary plate 41b at the predetermined rpm R2 in a second reverse direction.

The spin mop 80 includes the driven joint 415 that is rotated in engagement with a driving joint. The driving joint is exposed to the outside of the main body 10. At least a portion of the driven joint 415 is exposed to the outside of the mop module 40. In the separated state, the driving joint and the driven joint 415 are separated from each other. In the coupled state, the driving joint and the driven joint 415 are engaged.

One of the driving joint and the driven joint 415 includes a plurality of driving protrusions (not shown) disposed in a circumferential direction about a rotational axis of the one joint, and the other joint has a plurality of driving grooves 415 formed therein, which is disposed in a circumferential direction about a rotational axis of the other joint.

The plurality of driving protrusions are spaced apart from each other at a predetermined interval. The plurality of driving grooves 415h are spaced apart from each other at a predetermined interval. In the coupled state, the driving protrusions are provided to be inserted into the driving grooves 415h.

One of the driving joint and the driven joint 415 includes a plurality of driving protrusions 65a spaced apart from each other in a circumferential direction about a rotation axes of the one joint, and the other joint includes a plurality of opposing protrusions 415a spaced apart from each other in a circumferential direction about a rotational axis of the other joint. The plurality of opposing protrusions 415a protrude in the aforementioned direction.

Protruding ends of the opposite protrusions 415a are formed to be rounded. The protruding ends of the opposing protrusions 415a are formed to be rounded along a direction in which the plurality of opposing protrusions 415a is arranged. The protruding ends of the opposing protrusions 415a each have a corner portion rounded toward the opposing protrusions 415a with respect to a central axis of a protruding direction. Accordingly, when the separated state is changed to the coupled state, the driving protrusions 65a may move smoothly along the rounded protruding ends of the opposite protrusions 415a and inserted into the driving grooves 415h.

In this embodiment, the driving joint includes the driving protrusions 65a, and the driven joint 415 forms the driving grooves 415h. In this embodiment, the driven joint 415 includes the opposing protrusions 415a. The following description is based on this embodiment.

The driven joint 415 is fixed to an upper end of the spin shaft 414. The driven joint 415 includes a driven shaft portion 415b fixed to the spin shaft. The driven joint 415 includes the opposite protrusions 415a protruding from the driven shaft portion 415b. The opposite protrusions 415a protrudes from the driven shaft portion 415b in one of up and down directions, which is toward the driving joint.

The module housing 42 connects the pair of spin mops 41a, 41b. By means of the module housing 42, the pair of spin mop 41a, 41b are separated together from the body 10 and coupled together to the body 10. The main body seating portion 43 is disposed above the module housing 42. The spin mop 80 may be supported to be rotatable within the module housing 42. The spin mop 80 may be placed by passing through the module housing 42.

The module housing 42 may include an upper cover 421 forming an upper part, and a lower cover 423 forming a lower part. The upper cover 421 and the lower cover 423 are coupled to each other. The upper cover 421 and the lower cover 423 form an inner space for accommodating a portion of the spin mop 80.

A suspension unit 47, 48, 49 may be disposed in the module housing 42. The suspension unit 47, 48 and 49 may be disposed in the inner space formed by the upper cover 421 and the lower cover 423. The suspension unit 47, 48, 49 supports the spin shaft 414 to be able to move upward and downward within a predetermined range. The suspension units 47, 48, 49 according to this embodiment include a tilting frame 47, a tilting shaft 48 and an elastic member 49.

The module housing 42 may include a limit that limits a rotational range of the tilting frame 47. The limit may include a lower limit 427 that limits a downward rotational range of the tilting frame 47. The lower limit 427 may be disposed in the module housing 42. The lower limit 427 is provided to contact the lower limit contacting portion 477 in a state in which the tilting frame 47 is rotated to the maximum in the downward direction. In a state in which the moving robot 1 is properly disposed on an external horizontal surface, the lower limit contact portion 477 is spaced apart from the lower limit 427. In a state in which there is no force pushing from the lower surface of the spin mop 80 in the upward direction, the tilting frame 47 is rotated by a maximum angle, the lower limit contacting portion 477 comes into contact with the lower limit 427, and a tilt angle becomes the largest.

The limit may include an upper limit (not shown) that limits an upward rotational range of the tilting frame 47. In this embodiment, the upward rotational range of the tilting frame 47 may be limited by airtight contact between the driving joint and the driven joint 415. In a state in which the moving robot 1 is properly disposed on an external horizontal surface, the driven joint 415 is in close contact with the driving joint, and a tilt angle becomes the smallest.

The module housing 42 includes a second support 425 that fixes an end of the elastic member 49. When the tilting frame 47 is rotated, the elastic member 49 is elastically deformed or elastically restored by a first support 475 fixed to the tilting frame 47 and the second support 425 fixed to the module housing 42.

The module housing 42 includes a tilting shaft support 426 that supports the tilting shaft 48. The tilting shaft support 426 supports both ends of the tilting shaft 48.

The mop module 40 includes a module water supply unit 44 that guides water introduced from the water tank 32 to the spin mop 80 in the coupled state. The module water supply part 44 guides water from an upper side to a lower side. A pair of module water supply units (not shown) corresponding to the pair of spin mops 41a, 41b may be provided.

The module water supply unit (not shown) includes a water supply corresponding unit 441 that receives water from the water tank 32. The water supply corresponding part 441 is provided to be connected to the water supply connecting unit (not shown).

The module water supply unit 44 includes a water supply guide unit 445 that guides the water introduced into the water supply corresponding unit 441 to the spin mop 80. The water introduced into the water supply correspondence unit 441 flows into the water supply guide unit 445 through a water supply transmitting unit 443.

The water supply guide unit 445 is disposed at the tilting frame 47. The water supply guide unit 445 is fixed to a frame base 471. Water flows into a space formed by the water supply guide unit 445 through the water supply corresponding unit 441 and the water supply transmitting unit 443. Water scattering is minimized by the water supply guide unit 445 so that all water can flow into a water supply receiving unit 413.

The water supply guide unit 445 may include an inlet 445a that forms a space recessed from an upper side to a lower side. The inlet 445a may accommodate a lower end of the water supply transmitting unit 443. The inlet 445a may form a space in which the upper side is opened. Water that has passed through the water supply transmitting unit 443 is introduced through the upper opening of the space of the inlet 445a. One side of the space of the inlet 445a is connected to a flow path that forms a flow path portion 445b.

The water supply guide unit 445 may include the flow path portion 445b that connects the inlet 445a and an outlet 445c. One end of the flow path portion 445b is connected to the inlet 445a, and the other end of the flow path portion 445b is connected to the outlet 445c. A space formed by the flow path portion 445b serves as a water flow path. The space of the flow path portion 445b is connected to the space of the inlet 445a. The flow path portion 445b may be formed in a channel shape in which the upper side is opened. The flow path portion 445b may have an inclination that gradually decreases in height from the inlet 445a to the outlet 445c.

The water supply guide unit 445 may include the outlet 445c that discharges water into a water supply space of the water supply receiving unit 413. A lower end of the outlet 445c may be disposed in the water supply space. The outlet 445c forms a hole that is connected from an inner space of the module housing 42 to a space above the rotary plate 412. The hole of the outlet 445c connects the two spaces vertically. The outlet 445c forms a hole that penetrates the tilting frame 47 vertically. The space of the flow path portion 445b is connected to the hole of the outlet 445c. The lower end of the outlet 445c may be disposed in the water supply space of the water supply receiving unit 413.

The tilting frame 47 is connected to the module housing 42 via the tilting shaft 48. The tilting frame 47 rotatably supports the spin shaft 414. The tilting frame 47 is provided to be rotatable within a predetermined range about a tilting rotational axis Ota and Otb. The tilting rotational axis Ota, Otb extends in a direction transverse to a rotational axis Osa, Osb of the spin shaft 414. The tilting shaft 48 is disposed on the tilting rotational axis Ota, Otb. A left tilting frame 47 is provided to be rotatable within a predetermined range about a tilting rotational axis Ota. A right tilting frame 47 is provided to be rotatable within a predetermined range about a tilting rotational axis Otb.

The tilting frame 47 is disposed to be tiltable within a predetermined angular range with respect to the mop module 40. The tilting frame 47 allows a tilt angle to be changed according to a floor condition. The tilting frame 47 may perform a function of suspension of the spin mop 80 (to support the weight and reduce up and down vibration). The tilting frame 47 includes the frame base 471 that forms a lower surface. The spin shaft 414 is disposed by passing through the frame base 471 vertically. The frame base 471 may be formed in a plate shape that forms a vertical thickness. The tilting shaft 48 rotatably connects the module housing 42 and the frame base 471.

A bearing Ba may be provided between a rotational shaft support 473 and the spin shaft 414. The bearing Ba may include a first bearing disposed at a lower side and a second bearing disposed at an upper side.

A lower end of the rotational shaft support 473 is inserted into the water supply space of the water supply receiving unit 413. An inner circumferential surface of the rotational shaft support 473 supports the spin shaft 414.

The tilting frame 47 includes the first support 475 that supports one end of the elastic member 49. The other end of the elastic member 49 is supported by the second support 425 disposed in the module housing 42. When the tilting frame 47 is tilted on the tilting shaft 48, a location of the first support 475 is changed and a length of the elastic member 49 is changed.

The first support 475 is fixed to the tilting frame 47. The first support 475 is disposed at a left side of the left tilting frame 47. The first support 475 is disposed at a right side of the right tilting frame 47. The second support 425 is disposed in a left region of the first rotary plate 41a. The second support 425 is disposed in a right region of the second rotary plate 41b.

The first support 475 is fixed to the tilting frame 47. The first support 475 is tilted together with the tilting frame 47 upon a tilting operation of the tilting frame 47. A distance between the first support 475 and the second support 425 is the smallest when the tilt angle is minimized, and the distance between the first support 475 and the second support 425 is the largest when the tilt angle is maximized. In a state where the inclination angle is minimized, the elastic member 49 is elastically deformed, thereby providing a restoring force.

The tilting frame 47 includes the lower limit contact 477 that is provided to be in contact with the lower limit 427. A lower surface of the lower limit contact portion 477 may be provided to be able to contact an upper surface of the lower limit 427.

The tilting shaft 48 is disposed in the module housing 42. The tilting shaft 48 serves as the rotational axis of the tilting frame 47. The tilting shaft 48 may be disposed to extend in a direction perpendicular to an inclined direction of the spin mop 80. The tilting shaft 48 may be disposed to extend in a horizontal direction. In this embodiment, the tilting shaft 48 is disposed to extend in a direction inclined by an acute angle from a forward-backward direction.

The elastic member 49 applies an elastic force to the tilting frame 47. An elastic force is applied to the tilting frame 47 so that the tilt angle of the lower surface of the spin mop 80 relative to the horizontal surface increases.

The elastic member 49 is provided to extend when the tilting frame 47 is rotated downward, and to contract when the tilt frame is rotated upward. The elastic member 49 allows the tilting frame 47 to operate in a shock absorbing manner (an elastic manner). The elastic member 49 applies a moment force to the tilting frame 47 in a direction in which the tilt angle increases.

The spin mop 80 includes a rotary plate 81, 82, 412 provided to be rotated below the body 10. The rotary plate 412 may be formed as a circular plate-shaped member about the spin shaft 414. The cleaning cloth 411 is fixed to the lower surface of the rotary plate 412. The rotary plate 412 rotates the cleaning cloth 411. The spin shaft 414 is fixed to the center of the rotary plate 412.

The rotary plate 412 includes a second rotary plate 412 spaced apart from the first rotary plate 81, 412. A lower surface of the first rotary plate 412 may form a downward slope in a left forward direction, and a lower surface of the second rotary plate 82, 412 may form a downward slope in a right forward direction.

The rotary plate 412 includes a cleaning cloth fixing part that fixes the cleaning cloth 90, 411. The cleaning cloth fixing part may fix the cleaning cloth 411 detachably. The cleaning cloth fixing part may be Velcro® or the like, which is disposed at the lower surface of the rotary plate 412. The cleaning cloth fixing part may be a hook or the like, which is disposed at an edge of the rotary plate 412.

A water supply hole penetrating the rotary plate 412 in the up and down directions is formed. The water supply hole connects the water supply space and the lower side of the rotary plate 412. Through the water supply hole, water in the water supply space flows to the lower side of the rotary plate 412. Through the water supply hole, water in the water supply space flows to the cleaning cloth 411. The water supply hole is disposed at the center of the rotary plate 412. The water supply hole is disposed at a location where the spin shaft 414 is avoided. Specifically, the water supply hole is disposed at a location not overlapping the spin shaft 414 in the vertical direction.

The rotary plate 412 may form a plurality of water supply holes. A connecting part is disposed between the plurality of water supply holes. The connecting part connects a portion corresponding to a centrifugal direction of the rotary plate 412 with respect to the water supply hole and a portion corresponding to an opposite centrifugal direction of the rotary plate 412 with respect to the water supply holes. Here, the centrifugal direction refers to a direction away from the spin shaft 414, and the opposite centrifugal direction refers to a direction closer to the spin shaft 414.

The plurality of water supply holes may be spaced apart from each other along a circumferential direction of the spin shaft 414. The plurality of water supply holes may be arranged to be spaced apart from each other at a predetermined interval. A plurality of connecting parts may be arranged to be spaced apart from each other along the circumferential direction of the spin shaft 414. The water supply holes each are disposed between the plurality of connecting parts.

The rotary plate 412 includes an inclined portion disposed at a lower end of the spin shaft 414. Water in the water supply space flows down along the inclined portion by gravity. The inclined portion is formed along a circumference of a lower end of the spin shaft 414. The inclined portion forms a downward inclination in the opposite centrifugal direction. The inclined portion may form a lower surface of the water supply holes.

The spin mop 80 includes the cleaning cloth 411 that is coupled to the lower side of the rotary plate 412 to thereby contact the floor. The cleaning cloth 411 may be replaceable disposed at the rotary plate 412. The cleaning cloth 411 may be detachably fixed to the rotary plate 412 using Velcro® or a hook. The cleaning cloth 411 may be composed of the cleaning cloth 411 alone or may be composed of the cleaning cloth 411 and a spacer (not shown). The cleaning cloth 411 is a portion that directly contacts the floor to clean.

The spin mop 80 includes the spin shaft 414 that rotates the rotary plate 412. The spin shaft 414 is fixed to the rotary plate 412 and transmits a rotational force of the mop driving unit to the rotary plate 412. The spin shaft 414 is connected to an upper side of the rotary plate 412. The spin shaft 414 is disposed at the center of the upper side of the rotary plate 412. The spin shaft 414 is fixed to the rotational center Osa, Osb (rotational axis) of the rotary plate 412. The spin shaft 414 includes a joint fixing portion 414a that fixes the driven joint 415. The joint fixing portion 414a is disposed at an upper end of the spin shaft 414.

The mop module 40 includes the water supply receiving unit 413 that is disposed at the upper side of the rotary plate 412 to receive water. The water supply receiving unit 413 forms the water supply space in which water is received. The water supply receiving unit 413 forms the water supply space that is spaced apart from the spin shaft 414 while surrounding the circumference of the spin shaft 414. The water supply receiving unit 413 allows water supplied to the upper side of the rotary plate 412 to be collected in the water supply space until the water passes through the water supply holes. The water supply space is disposed at the center of the upper side of the rotary plate 412. The water supply space has a cylindrical volume as a whole. The upper side of the water supply space is opened. Water flows into the water supply space through the upper side of the water supply space.

The water supply receiving unit 413 protrudes upward from the rotary plate 412. The water supply receiving unit 413 extends along the circumferential direction of the spin shaft 414. The water receiving part 413 may be formed in a ring-type rib shape. The water supply holes are provided in an inner lower surface of the water supply receiving unit 413. The water supply receiving unit 413 is spaced apart from the spin shaft 414. A lower end of the water supply receiving unit 413 is fixed to the rotary plate 412. An upper end of the water receiving container 413 has a free end.

Figure 4:
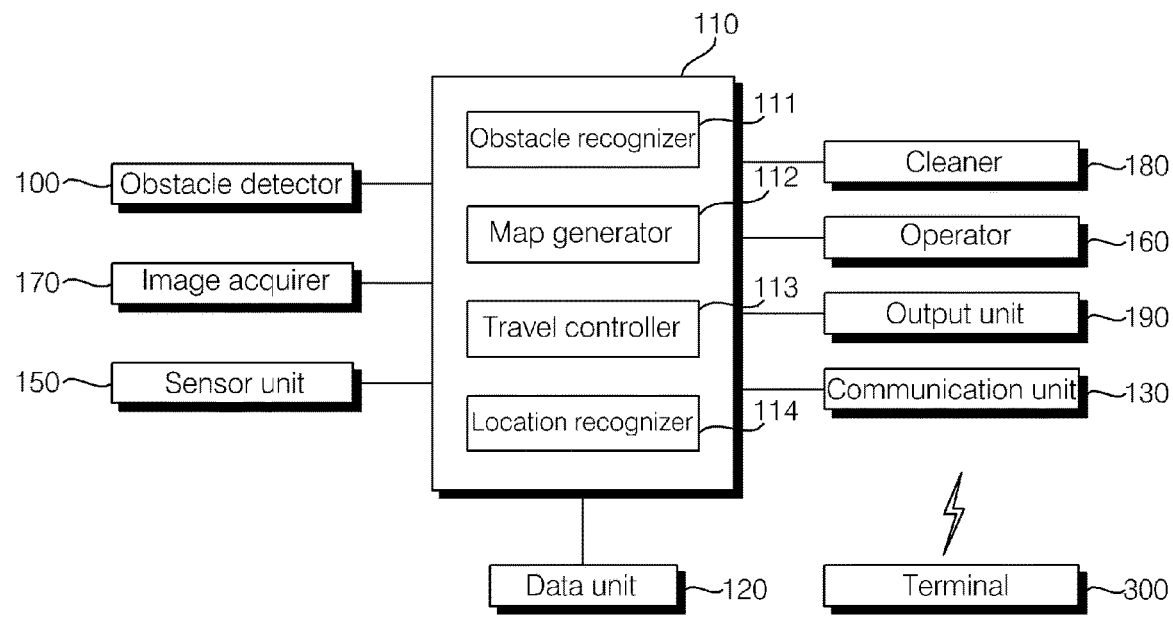
FIG. 4 is a block diagram illustrating a configuration of the moving robot according to an embodiment of the present disclosure.

FIG. 4 is a block diagram briefly illustrating configuration of a moving robot according to an embodiment of the present disclosure. The moving robot 1 includes a cleaner 180, a data unit 120, an obstacle detector 100, an image acquirer 170, a sensor unit 150, and a communication unit 130, an operator 160, an output unit 190, and a controller 110 for controlling overall operations.

The operator 160 includes an input means such as at least one button, a switch, or a touch pad to receive a user command. The operator may be provided at the top part of the main body 10 as described above.

The output unit 190 has a display such as an LED and an LCD, and displays an operation mode, reservation information, a battery status, an operating state, an error status, and the like of the moving robot 1. In addition, the output unit 190 is provided with a speaker or a buzzer, and outputs predetermined sound effect, warning sound, or voice guidance corresponding to an operation mode, reservation information, a battery status, an operating state, an error status, and the like.

In some cases, the moving robot may further include an audio input unit (not shown). The audio input unit includes at least one microphone, and receives sound generated in a surrounding area or region within a certain distance from the main body 10. The audio input unit may further include a signal processor (not shown) that filters, amplifies, and converts input sound. The moving robot 1 may operate by recognizing a voice command input through the audio input unit.

The data unit 120 stores an acquired image input from the image acquirer 170, reference data used for an obstacle recognizer 111 to determine an obstacle, and obstacle information on a sensed obstacle. The data unit 120 stores obstacle data for determining a type of obstacle, image data in which a captured image is stored, and map data regarding an area. The map data includes obstacle information, and various types of maps for travelable areas to be searched by the moving robot are stored.

The data unit 120 may include an image captured through the image acquirer 170, for example, a still image, a video, and a panoramic image. In addition, the data unit 120 stores control data for controlling an operation of the moving robot, data according to a cleaning mode of the moving robot, and a sensing signal such as ultrasound/laser sensed by the sensor unit 150.

In addition, the data unit 120 may store data readable by a microprocessor, and may include Hard Disk Drive (HDD), Solid State Disk (SSD), Silicon Disk Drive (SDD), Read-Only Memory (ROM), Random-Access Memory (RAM), etc.

The communication unit 130 communicates with the terminal 300 in a wireless communication method. Further, the communication unit 130 may be connected to an Internet network over a network at home and communicate with an external server (not shown) or a terminal 300 for controlling a moving robot.

The communication unit 130 transmits a generated map to the terminal 300, receives a cleaning command from the terminal, and transmits data on an operating state and a cleaning state of the moving robot to the terminal. In addition, the communication unit 130 may transmit information on an obstacle detected during traveling to the terminal 300 or the server. The communication unit 130 transmits and receives data, including communication modules such as short-range wireless communication such as ZigBee, Bluetooth, Wi-Fi, and WiBro.

The communication unit 130 may communicate with the charging stand 2 and receive a charging signal for returning to the charging stand or a guide signal for docking with the charging stand. The moving robot 1 searches for the charging stand based on a signal received through the communication unit 130 and is docked with the charging stand.

On the other hand, the terminal 300 is a device in which a communication module is installed to access a network and a program or application for controlling the moving robot is installed, and a computer, a laptop, a smartphone, a PDA, a tablet PC, and the like may be used as the terminal. In addition, a wearable device such as a smart watch may be used as the terminal.

The terminal 300 may output a predetermined warning sound or display a received image according to data received from the moving robot 1.

The terminal 300 may receive data on the moving robot 1, monitor an operating state of the moving robot, and control the moving robot 1 using a control command.

The terminal 300 may be directly connected to the moving robot 1 on a one-to-one basis, and may also be connected through a server, for example, a home appliance management server.

The cleaner 180 rotates the first rotary plate 81 and the second rotary plate 82 of the spin mop 80 through a driving unit (not shown) to remove foreign substances from a floor surface according to the rotation of the attached cleaning cloth 90.

The main body 10 moves by the rotation of the first and second rotary plates 81 and 82 of the cleaner 180. Accordingly, the cleaner 180 may operate as a traveler.

In addition, the cleaner 180 may further include a water supply unit (not shown) and the water tank 32, the water supply unit connected to the spin mop 80 to supply water to the cleaning cloth attached to the first and second rotary plates. The water supply may include a pump or a valve.

The cleaner 180 may include a separate cleaning cloth tool for mounting the cleaning cloth to the spin mop. The battery (not shown) supplies power required not only for the motor, but also for the overall operations of the moving robot 1. When the battery is discharged, the moving robot 1 may travel to return to the charging stand for charging, and during such return traveling, the moving robot 1 may detect a location of the charging stand by itself.

The charging stand 2 may include a signal transmitter (not shown) for transmitting a predetermined return signal. The return signal may be an ultrasonic signal or an infrared signal, but not limited thereto.

The obstacle detector 100 emits a pattern of a predetermined shape, and acquires the emitted pattern as an image. The obstacle detector may include at least one pattern emitter (not shown) and a pattern acquirer.

In addition, the obstacle detector may include a sensor, such as ultrasonic sensor, a laser sensor, an infrared sensor, and a 3D sensor, to detect a location of an obstacle. In addition, the obstacle detector 100 may detect an obstacle based on an image of a direction of travel. The sensor unit and the image acquirer may be included in the obstacle detector.

The sensor unit 150 includes a plurality of sensors to detect an obstacle. The sensor unit 150 detects an obstacle located in a forward direction, that is, in a direction of travel, using at least one of an ultrasonic sensor, a laser sensor, and an infrared sensor. The sensor unit 150 may be used as an auxiliary means for detecting an obstacle that cannot be detected by the obstacle detector.

In addition, the sensor unit 150 may further include a cliff sensor that detects the presence of a cliff (ledge, step, an abrupt change in height, etc.) on a floor within a travel area. When a transmitted signal is reflected and incident, the sensor unit 150 inputs information on whether an obstacle exists or a distance to the obstacle as an obstacle detection signal to the controller 110.

The sensor unit 150 includes at least one inclination sensor to detect an inclination of the main body. When inclined in the forward, rearward, leftward, or leftward direction of the main body, the inclination sensor calculates the inclined direction and an inclined angle. The inclination sensor may be a tilt sensor, an acceleration sensor, and the like, and an acceleration sensor may be any of a gyro type, an inertial type, and a silicon semiconductor type.

The sensor unit 150 may detect a rotation angle and a traveling distance of the main body 10. An angle may be measured using a gyro sensor and the traveling distance may be measured using a laser OFS. In addition, the sensor unit 150 may detect an operating state or an error state using a sensor installed inside the moving robot 1.

The image acquirer 170 is composed of at least one camera. The image acquirer 170 may include a camera that converts an image of a subject into an electrical signal, converts the electrical signal back into a digital signal, and stores the digital signal in a memory device. The camera may include at least one optical lens, an image sensor (e.g., a CMOS image sensor) including a plurality of photodiodes (e.g., pixels) on which an image is created by light transmitted through the optical lens, and a digital signal processor (DSP) to construct an image based on signals output from the photodiodes. The DSP may produce not only a still image, but also a video consisting of frames constituting still images.

The image sensor is a device that converts an optical image into an electrical signal, and is formed as a chip having a plurality of photodiodes integrated therein. For example, the photodiodes may be pixels. When light, having passed through the lens, forms an image on the chip, charges are accumulated in the respective pixels constructing the image, and the charges accumulated in the pixels are converted into an electrical signal (for example, voltage). As is well known, a Charge Coupled Device (CCD), a Complementary Metal Oxide Semiconductor (CMOS), and the like, may be used as the image sensor.

When the moving robot operates, the image acquirer 170 continuously captures images. In addition, the image acquirer 170 may capture an image at a predetermined cycle or at a predetermined distance unit. The image acquirer 170 may set a shooting cycle according to the moving speed of the moving robot. The image acquirer 170 may acquire not just an image of an area forward in a direction of travel, but also an image of an upward ceiling shape. The image acquirer 170 stores an image, which is captured during traveling of the main body, in the data unit 120 as image data.

The obstacle detector 100 inputs information on a detected location of a detected obstacle or movement of the obstacle to the controller 110. The sensor unit 150 may input a detection signal regarding an obstacle detected by a provided sensor to the controller. The image acquirer 170 inputs a captured image to the controller.

The controller 110 controls the moving robot to travel within a designated area in an entire travel area. The controller 110 sets an operation mode of the moving robot by processing data input by an operation of the operator 160, outputs an operation state through the output unit 190, and outputs warning sound, sound effect, and voice guidance through a speaker of the output unit according to an operating state, an error state, or detection of an obstacle.

The controller 110 generates a map of a travel area based on an image acquired from the image acquirer 170 and obstacle information detected from the sensor unit 150 or the obstacle detector 100. The controller 110 may generate a map of a travel area based on obstacle information while traveling in the area, and in this case, the controller may generate the map by determining a shape of the travel area based on an image acquired from the image acquirer.

The controller 110 recognizes an obstacle detected by the image acquirer 170 or the obstacle detector 100, and performs a control to travel by performing a predetermined operation or changing a route in response to the recognition of the obstacle. In addition, the controller may output predetermined sound effect or warning sound through the output unit as necessary, and may control the image acquirer to capture an image.

In addition, the controller 110 controls the cleaner 180 to move while cleaning the floor surface in response to a cleaning command. When the main body 10 moves in response to rotation of the cleaner 180, the controller 110 determines an operating state based on whether the main body moves along a designated traveling path and whether the main body properly travels.

The controller 110 sets a movement path to a specific destination, and performs a control to avoid an obstacle while traveling along a movement path. At this time, in the case where the main body is set to travel straight forward, if the main body 10 deviates from the traveling path without traveling straight forward, the controller 110 may determine an abnormal traveling state.

For example, in the case where the main body is set to travel straight forward, if the main body 10 does not move, if the main body 10 is not allowed to travel straight forward, if the main body continuously rotates in place, and if a traveling distance is not calculated and there is only a change in the rotation angle, the controller 110 may determine an abnormal traveling state and also determine that there is a problem with attachment of the cleaning cloth. In determining whether the cleaning cloth is attached, the controller 110 may determine whether there is an obstacle and whether the abnormality in the traveling state is caused by an abnormality in the driving unit or the motor.

When the abnormal traveling state is detected while the motor is normally operating in the absence of any obstacle, the controller 110 may determine that the abnormal traveling state is caused by the absence of the cleaning cloth. When the abnormal traveling state is detected, the controller 110 may determine whether the abnormal traveling state is caused by an abnormality in the driving unit provided in the cleaner, an abnormality in the floor condition, or absence of the cleaning cloth, may generate a warning corresponding to a determined reason for the abnormal traveling state, and output the generated warning through the output unit 190.

In the case of traveling normally, the controller 110 performs a control to clean the floor surface while traveling a designated area according to a previously input cleaning command. If there is an abnormality in the traveling state, the controller 110 stops the operation. The controller 110 stops the operation when it is determined that the cleaning cloth is not installed or the motor or the driving unit is in an abnormal state. In addition, the controller 110 generates a warning according to occurrence of an abnormality and transmits the generated warning through the communication unit 130 to the terminal 300.

When a cleaning command is input again from the operator or the terminal 300, the controller 110 may reattempt to travel and re-determine a traveling state. The controller 110 may analyze sound input through the audio input unit to recognize a voice. In some cases, the controller 110 may transmit input sound to a voice recognition server (not shown) to recognize an input voice. When the voice recognition is completed, the controller 110 performs an operation corresponding to a voice command. In addition, the controller 110 outputs voice guidance corresponding to the voice command through the speaker of the output unit 190.

The controller 110 checks the charging capacity of the battery and determines a time to return to the charging stand. When the charging capacity reaches a predetermined value, the controller 110 stops an operation being performed and starts searching for the charging stand to return to the charging stand. The controller 110 may output a notification about the charging capacity of the battery and a notification about return to the charging stand. Further, when a signal transmitted from the charging stand is received through the communication unit 130, the controller 110 may return to the charging stand.

The controller 110 includes an obstacle recognizer 111, a map generator 112, a travel controller 113, and a location recognizer 114. In the case of an initial operation or in the case where no map about an area is stored, the map generator 112 generates a map of the area based on obstacle information while traveling the area. In addition, the map generator 112 updates a previously generated map based on obstacle information acquired during traveling. In addition, the map generator 112 generates a map by analyzing an image acquired during traveling and determining a shape of the area based on a result of the analysis. After generating a basic map, the map generator 112 divides a cleaning area into a plurality of areas and generates a map that includes passages connecting the plurality of areas and information on any obstacle in each of the plurality of areas. The map generator 112 processes a shape of each divided area. The map generator 112 may set attributes for each divided area.

In addition, the map generator 112 may distinguish an area based on features extracted from an image. The map generator 112 may determine a location of a door based on a connection relationship of the features, and may distinguish boundaries between the areas to generate a map composed of the plurality of areas.

The obstacle recognizer 111 may determine an obstacle based on data input from the image acquirer 170 or the obstacle detector 100, the map generator 112 may generate a map of a travel area, and information on a detected obstacle may be included in the map. The obstacle recognizer 111 analyzes data input from the obstacle detector 100 to determine an obstacle. A direction of an obstacle or a distance to the obstacle is calculated according to a detection signal from the obstacle detector, for example, an ultrasonic signal, a laser signal, or the like. In addition, the obstacle recognizer may extract the pattern by analyzing an acquired image including a pattern and determine an obstacle by analyzing a shape of the pattern. When an ultrasonic or infrared signal is used, there may be a difference in shape of received ultrasonic waves or a difference in time of receiving the ultrasonic waves according to a distance to an obstacle or a location of the obstacle, and therefore, the obstacle recognizer 111 determines the obstacle based on the above.

The obstacle recognizer 111 may determine an obstacle located around the main body by analyzing an image captured through the image acquirer 170. The obstacle recognizer 111 may detect a human body. The obstacle recognizer 111 analyzes data input through the obstacle detector 100 or the image acquirer 170, detect a human body based on a silhouette, a size, a face shape, and the like, and determine whether the corresponding human body is a registered user.

The obstacle recognizer 111 extracts features of an object by analyzing image data, determines an obstacle based on a form (shape), a size, and a color of the obstacle, and determines a location of the obstacle. The obstacle recognizer 111 may determine an obstacle by extracting features of the obstacle based on previously stored obstacle data, except a background of an image, from image data. The obstacle data is updated by new obstacle data received from the server. The moving robot 1 may store obstacle data on a detected obstacle and receive data on a type of the obstacle from the server for other data.

In addition, the obstacle recognizer 111 may store information on a recognized obstacle in obstacle data and may transmit recognizable image data to a server (not shown) through the communication unit 130 to determine a type of the obstacle. The communication unit 130 transmits at least one image data to the server. The obstacle recognizer 111 determines an obstacle based on image data converted by an image processor.

The location recognizer 114 calculates a current location of the main body. The location recognizer 114 may determine a current location based on a signal received using a provided location recognizing device, for example, GPS, UWB, or the like. The location recognizer 114 may extract features from an image acquired from the image acquirer, that is, image data, and compare the features to determine a current location. The location recognizer 114 may determine a current location based on a structure surrounding the main body, a ceiling shape, and the like, which are found in an image.

The location recognizer 114 detects features such as points, lines, and planes for predetermined pixels constituting an image, and analyzes characteristics of an area based on the detected features to determine a current location. The location recognizer 114 may extract an outline of a ceiling and extract features such as lighting. The location recognizer 114 continuously determines a current location in an area based on image data, matches features, performs learning by matching features and reflecting a change in a surrounding structure, and calculates a value of the location.

The travel controller 113 performs a control to travel an area based on a map and to change a direction of travel or a traveling path based on detected obstacle information to pass through or avoid an obstacle. The travel controller 113 controls the cleaner 180 according to the cleaning command, so that cleaning can be performed as the main body 10 removes foreign substances from a floor surface while traveling the cleaning area. The travel controller 113 controls a driving unit (not shown) of the cleaner 180 to control the operation of the first rotary plate 81 and the second rotary plate 82 independently, so that the main body 10 travels straight forward or rotates to travel.

The travel controller 113 controls the main body to move to a set area based on a map generated by the map generator 112 or move within the set area. In addition, the travel controller 113 controls traveling based on a current location calculated from the location recognizer 114. The travel controller 113 performs a control to perform a predetermined operation in response to an obstacle or change a traveling path according to a detection signal from the obstacle detector 100.

The travel controller 113 performs a control to perform at least one of the following in response to a detected obstacle: avoiding the obstacle, approaching the obstacle, setting an approaching distance, stopping, decelerating, accelerating, reverse traveling, making a U-turn, and changing a direction of travel. In addition, the travel controller 113 outputs an error and may output predetermined warning sound or voice guidance as necessary.

Figure 5:
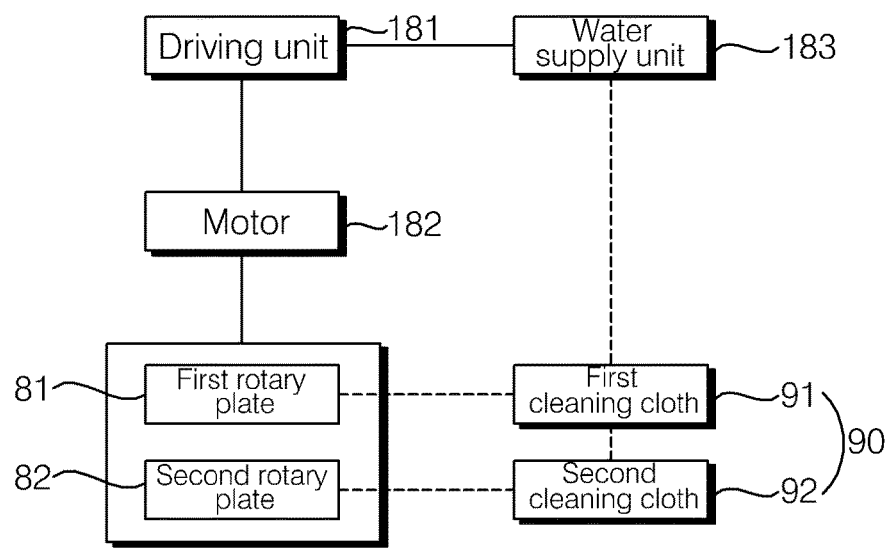
FIG. 5 is a block diagram illustrating a configuration of the cleaner of a moving robot according to an embodiment of the present disclosure.

FIG. 5 is a block diagram briefly illustrating configuration of a cleaner of a moving robot according to an embodiment of the present disclosure. As shown in FIG. 5, the cleaner 180 allows the main body 10 to move while cleaning a floor surface.

The cleaner 180 includes a driving unit 181, a cleaning cloth 90, a spin mop 80, 185, a water supply unit, and a motor 182. The spin mop 185, 80 is connected to a rotational shaft of the motor 182 to rotate. The spin mop 185 includes a first rotary plate 81 and a second rotary plate 82. In addition, the spin mop 185 may further include an adjuster (not shown) that adjusts a distance between the casing and the first rotary plate 81 and a distance between the casing and the second rotary plate 82, so that cleaning cloths 90, 91, 92 attached to the first rotary plate 81 and the second rotary plate 82 can contact the floor surface. The adjuster may apply a pressure of a predetermined strength, so that the first rotary plate 81 and the second rotary plate 82 can contact the floor surface. Accordingly, the cleaning cloths are attached to the first rotary plate 81 and the second rotary plate 82 to contact the floor surface, regardless of a thickness.

The first rotary plate 81 and the second rotary plate 82 may be configured such that first and second cleaning cloths 91 and 92 can be directly installed at the first and second rotary plates, respectively. For example, Velcro® (or another attachment mechanism) may be attached to the first rotary plate 81 and the second rotary plate 82 to fix the cleaning cloths.

Additionally or alternatively, cleaning cloth frames (not shown) may be installed at the first rotary plate 81 and the second rotary plate 82. The cleaning cloths are fitted to the cleaning cloth frames and installed at the first rotary plate 81 and the second rotary plate 82.

The first rotary plate 81 and the second rotary plate 82 rotate and operate independently of each other. The first rotary plate 81 and the second rotary plate 82 are connected to the rotational shaft of the motor, rotate, and may operate in different directions and at different rotation speeds.

The driving unit 181 controls a rotational speed, driving, and stopping of the motor 182 in response to a control command from the travel controller 113. The driving unit 181 supplies operation power for driving the motor. The driving unit 181 operates when the main body 10 moves to a destination along a movement path or cleans a designated area. The driving unit 181 controls the motor 182 such that the first and second rotary plates are rotated independently. The driving unit 181 controls the motor 182 by determining whether to operate the first rotary plate 81 and the second rotary plate 82 and rotational speeds of the first rotary plate 81 and the second rotary plate 82 according to a movement path, a shape of an area, and a size and a location of an obstacle.

The motor 182 transmits a rotational force to the first rotary plate and the second rotary plate. The motor 182 may be provided in plural. For example, a first motor (not shown) may be connected to the first rotary plate, and a second motor (not shown) may be connected to the second rotary plate. The motor 182 rotates the first rotary plate 81 in a first direction, and rotates the second rotary plate 82 in a second direction, which is a direction opposite to the first direction, so that the main body 10 can move forward.

In addition, in the case of moving to the left or right along a movement path, the motor 182 may rotate the first rotary plate and the second rotary plate differently to move the main body 10. The motor can rotate the main body 10 by stopping one of the first rotary plate and the second rotary plate and rotating the other one.

The water supply unit 183 supplies water contained in the water tank to the cleaning cloth. The water supply unit supplies water to the cleaning cloth while the main body 10 performs cleaning, so that the cleaning cloth can remain wet. The water supply unit 183 supplies a predetermined amount of water to the cleaning cloths for a predetermined period of time. The water supply unit 183 includes a connecting flow path that connects the cleaning cloths and the water tank.

When the driving of the motor is stopped by the driving unit 181, the water supply unit 183 may stop water supply. The water supply unit 183 may include a valve (not shown) that controls water supply to the cleaning cloths. In addition, the water supply unit 183 may include a pump (not shown) that controls a water supply from the water tank to the cleaning cloths. When the driving of the motor is stopped, the controller 110 may stop the operation of the pump or close the valve to prevent water from being supplied to the cleaning cloths.

Figure 6:
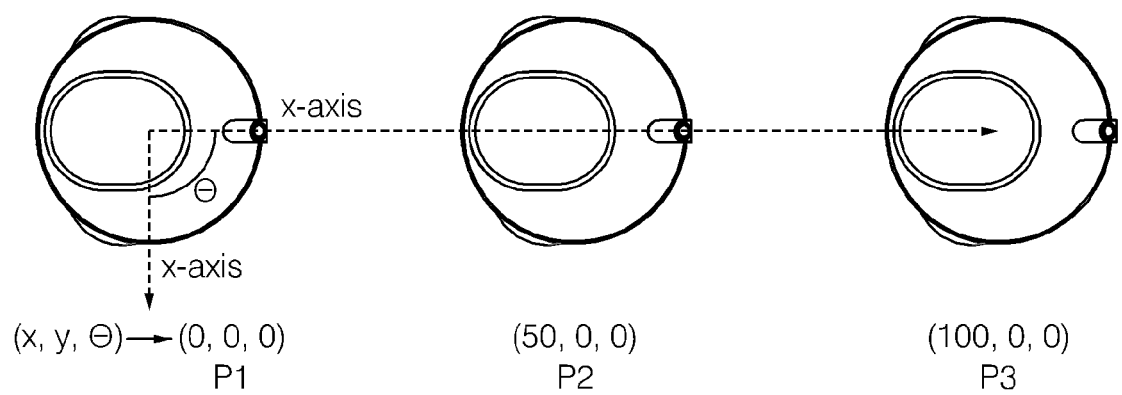
FIG. 6 is a schematic view illustrating a coordinate change in response to movement of a moving robot according to an embodiment of the present disclosure.

FIG. 6 is a schematic view referred to for explaining a coordinate change in response to movement of a moving robot according to an embodiment of the present disclosure. As illustrated in FIG. 6, the moving robot 1 may move linearly from a first point P1 to a third point P3 via a second point P2. When a motor of the cleaner 180 starts rotating, the moving robot 1 moves in a designated direction.

When the cleaning starts, the controller 110 causes the main body 10 to travel straight forward for a predetermined distance, and determines a traveling state. The controller 110 may travel straight forward in a designated direction and determine a traveling state based on coordinates at a second point and the third point. In addition, the controller 110 may determine a traveling state by comparing a traveling pattern according to a movement path.

The controller 110 may include a sensor for sensing a traveling distance and a rotation angle in the sensor unit 150 to calculate the traveling distance and the rotation angle during traveling. For example, the controller 110 may calculate a traveling distance with respect to X-axis and Y-axis using a distance sensor (not shown), and calculate the installation and an angle of the main body using an angle sensor (not shown).

In addition, the controller 110 may calculate a traveling distance and a rotation angle based on a motor RPM and a rotational speed of the cleaner 180. The controller 110 may calculate a traveling distance and a rotation angle based on an acquired image. The moving robot 1 may travel straight forward as the first rotary plate 81 of the cleaner 180 is rotated in a first direction, and the second rotary plate 82 is rotated in a second direction. As the first cleaning cloth 91 and the second cleaning cloth 92 are installed at the first rotary plate and the second rotary plate, the moving robot 1 cleans a floor surface while traveling straight forward to reach the third point P2 through the first point P1 and the second point P2.

When the moving robot 1 moves from the first point P1 to the third point P3, the water supply unit 183 supplies water from the water tank 32 to the cleaning cloth to keep the cleaning cloth wet. While the main body 10 is moving, the controller 110 determines a current location through the location recognizer 114. The location recognizer 114 calculates and stores coordinates representing each point based on a rotation angle and a traveling distance.

The location recognizer 114 calculates coordinates of the main body 10 based on X-axis, Y-axis, and a rotation angle based on a start point and a direction of travel at the start point. For example, the coordinates of the start point may be set as (0, 0, 0) with respect to X-axis, Y-axis, and a rotation angle. When the main body 10 travels straight forward to reach the second point P2, the coordinates of the second point are moved in a direction of X-axis and thus changed to (50, 0, 0) according to a traveling distance. In addition, to reach the third point, the main body moves in the direction of X axis without rotating, the coordinates of the third point are (100, 0, 0).

When moving from the first point P1 to the third point P3, the controller 110 determines a traveling state based on displacement in a distance and an angle. The controller may determine a traveling state based on an angle measured by a gyro sensor and a traveling distance measured by a laser OFS. In addition, even when there is a change in a traveling distance or a rotation angle within an error range, the controller 110 determines that a traveling state is normal if a value of the change falls within the error range. The controller 110 may determine an angle trajectory based on a value set within a range of 1 to 2 times the radius of the main body. For example, the controller may set a reference for an angle trajectory based on a value that is 1.5 times the radius of the main body.

Since the vehicle travels straight forward from the first point in the direction of X-axis, the controller 110 may determine a traveling state as normal based on a change of the X-axis coordinate according to a traveling distance. If an obstacle is detected through the obstacle detector 100 while the moving robot travels straight forward, the controller 110 performs obstacle avoidance with respect to the detected obstacle, travels straight forward again, and determines a traveling state.

In addition, when an abnormal traveling state is detected while a current value of a motor is normal, the controller may determine that the abnormal traveling state is caused by the absence of a cleaning cloth. When the main body is not moving move while the current value of the motor indicates in a no-load state, the controller 110 may determine that the cleaning cloth is not installed.

Further, when a difference between current values of the respective motors of the first and second rotating values is a predetermined value or more while the main body is rotating, the controller 110 may determine that any one cleaning cloth is not installed.

Figure 7:
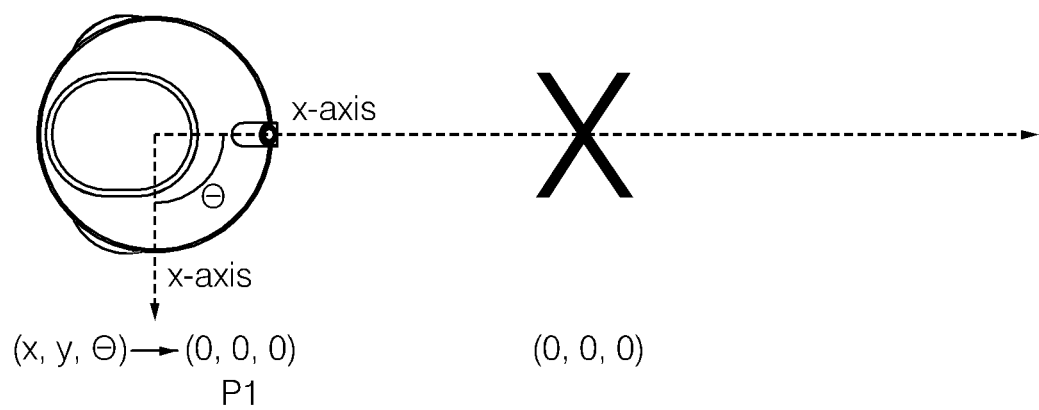
FIG. 7 is an example schematic view for explaining movement of a main body in the absence of a cleaning cloth of a moving robot according to an embodiment of the present disclosure.

FIG. 7 is an example referred to for explaining movement of a main body according to the absence of a cleaning cloth of a moving robot according to an embodiment of the present disclosure. As shown in FIG. 7, the moving robot 1 may determine a traveling state on the basis of a location change within a predetermined period of time with reference to a point in time at which the motor of the cleaner operates. After applying a control command to the cleaner to move from the first point to the third point, the controller 110 determines a traveling state by comparing a location change or a traveling pattern at a predetermined time interval.

The driving unit 181 drives a motor according to a control command, and the main body 10 moves as the first rotary plate 81 and the second rotary plate 82 are rotated in response to rotation of the motor. If there is no location change within the predetermined period of time, the controller 110 determines that there is an abnormality in traveling. As an abnormal state as the coordinates are maintained at (0,0,0) for the predetermined period of time or longer, the controller determines a traveling state as an abnormal state as the coordinates are maintained at (0,0,0) for the predetermined period of time or longer.

When there is no location change of the main body 10 in the absence of an obstacle, the controller 110 determines an abnormal state. When an obstacle is detected by the obstacle detector, the controller 110 performs obstacle avoidance to avoid the obstacle, travels straight forward again, and then determine a traveling state.

In addition, when there is no obstacle while the motor current is within a normal range and there is no change in the location of the main body, the controller may determine an abnormal state. The controller 110 determines whether the motor is an abnormal state based on respective currents of motors that rotate the first and second rotary plates of the cleaner. In addition, the controller 110 may determine a floor state based on a current of a motor, and may determine whether a cleaning cloth is absent by taking into consideration the floor state according to a sensed current value.

If there is an abnormality in traveling, the controller 110 may determine that cleaning cloths are not installed at the first rotary plate 81 and the second rotary plate 82, that there is an abnormality in the driving unit or the motors, or that the first or second rotary plates are not allowed to be rotated due to foreign substances.

If the driving unit and the motors are in a normal state, the controller 110 may determine that the first cleaning cloth 91 and the second cleaning cloth 92 are not installed. The controller 110 may determine whether the driving unit and the motors are in a normal state based on a current of the motor. If a detected current value of a motor falls within a predetermined range, the controller 110 determines a normal state, and if a detected current value of a motor is outside the predetermined range, the controller determines that there is an abnormality in the driving unit or the motor.

Considering that a measured motor current varies depending on moisture content of a cleaning cloth being installed, the controller 110 may determine whether a current value is normal by differentiating a no-load state, a dry clothing cloth state, a wet cleaning cloth state, and a restrained state.

The controller 110 may determine a state of a cleaning cloth based on a current value of a motor. In this case, the controller 110 may determine the no-load state in the case of about 50 to 70 mA, and the dry cleaning cloth state in the case of 250 to 350 mA, the wet cleaning cloth state in the case of 350 to 8000 mA, and the restrained state in the case of 1A or more. The controller 110 may divide the wet cleaning cloth state into 2 to 3 stages according to a stage of moisture content.

While a cleaning cloth is normally attached, the controller 110 determines a state of the cleaning cloth according to a current value, as described above, and when a rotary plate does not contact a floor due to the absence of a corresponding cleaning cloth, a current value indicating the no-load state may be detected. Meanwhile, when a rotary plate contacts the floor to thereby increase a friction, the controller 110 may detect a current value indicating the restrained state. However, in the case of a restrained state, it may be due to an abnormality of a motor or a driving part, and thus it is necessary to classify it first. Therefore, when a current value indicating the no-load state or a current value indicating the restrained state is detected, the controller may determine the absence of a cleaning cloth or an abnormality of the motor.

When a current value is 0 or less than 20 ma, the motor does not operate and thus the controller 110 may determine an abnormality of the driving unit or the motor. In the case where a current value of the motor indicates the dry cleaning cloth state or the wet cleaning cloth state, if it is determined that there is no obstacle and an abnormal traveling state is determined, the controller may determine the abnormal traveling state is caused due to the absence of a cleaning cloth.

In addition, if a difference between current values of the respective motors of the first and second rotary plates is a predetermined value or more, the controller 110 may determine that a cleaning cloth is not attached to one side. In addition, since a different friction is applied according to a material of the floor, a load to the motor changes, and thus, the controller 110 may determine the material of the floor based on a current value of the motor.

The controller 110 may store data on a current value of the motor, which is measured when a cleaning cloth is attached, and may determine a floor state by comparing measured current values.

In addition, based on a change in a current value when a cleaning cloth is not attached, the controller 110 may determine an installation state of the cleaning cloth or a floor state. For example, when the floor is a carpet, as the friction increases, a current of 700 to 900 mA is detected based on a wet cleaning cloth, and accordingly, the controller 110 may determine that the floor is the carpet. Meanwhile, when the moving robot moves on a carpet while the cleaning cloths are not attached to both sides, a different friction is applied compared to the case where the cleaning cloths are attached, and thus, an abnormality of the traveling state or the floor state may be determined according to a change in current values.

In addition, after controlling the moving robot to wait for a predetermined period of time and travel again, the controller 110 may determine a location change and determine that the traveling state is abnormal. When traveling straight forward at the reattempt of traveling, the controller 110 may determine a temporary abnormality. In the abnormal state, the controller 110 applies a control command to the driving unit 181 so that the main body 10 stops operating. Accordingly, the cleaner 180 stops operation of the motor and the water supply unit stop.

The controller 110 generates a warning for guiding impossibility of movement and requesting inspection, and outputs the warning through an output unit 119. In addition, the controller 110 may output guidance to mount a cleaning cloth. The controller 110 may display a warning in a combination of at least one of a message, an icon, and an image on a control panel provided on an upper portion of the main body 10, and may turn on a warning light, and may also output a warning in the form of a voice.

In addition, the controller 110 may transmit a warning to the terminal through the communication unit 130. The terminal 300 may output a warning in a manner of displaying the warning on a screen or generating warning sound or vibration.

Figure 8:
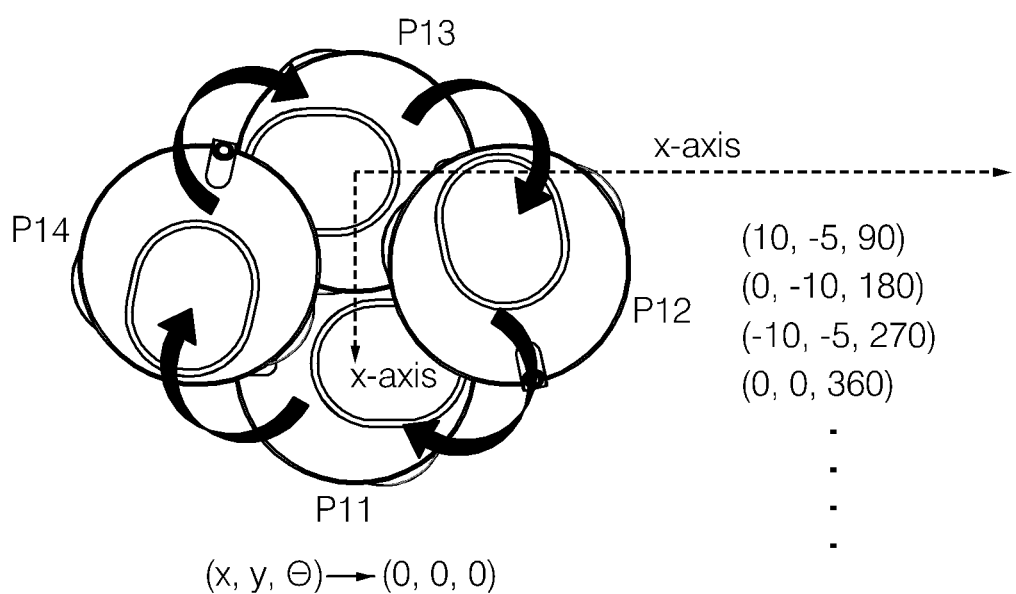
FIG. 8 is another example schematic view for explaining movement of a main body in the absence of a cleaning cloth of a moving robot according to an embodiment of the present disclosure.

FIG. 8 is another example referred to for explaining movement of a main body in the absence of a cleaning cloth of a moving robot according to an embodiment of the present disclosure. As shown in FIG. 8, the moving robot determines a traveling state according to a location change for a predetermined period of time. In the case where, despite a location change of the main body 10 for the predetermined period of time, a traveling distance is within a predetermined range and a rotation angle is consistently changed in any one direction, the controller 110 may determine that there is abnormality in traveling. For example, in the case where while the main body 10 moves from an eleventh point P11 to a fourteenth point P14, coordinates of respective points are changed from (10, −5, 90) through (0, −10, 180) and (−10, −5, 270) to (0, 0, 360), a traveling distance is within the range of 5 to 10 with respect to X axis and Y axis, and a rotation angle is increased by a predetermined unit from 90 degrees through 180 degrees and 270 degrees to 360 degrees, and accordingly, the controller 110 may determine that the main body 10 is rotating in place.

When an obstacle is detected, the controller 110 may determine a restrained state due to the presence of the obstacle. In addition, when no obstacle is detected, the controller 110 may determine that a cleaning cloth is installed at one side of the first rotary plate 81 and the second rotary plate 82 and that a cleaning cloth is not installed at the other side. The controller 110 may consider not only the presence or absence of an obstacle, but also a cleaning cloth or a floor state according to a current value of a motor.

When the rotation angle is changed as described above, the main body 10 is rotating in the clockwise direction, and thus, the controller 110 may determine that a second cleaning cloth is not installed at the second rotary plate. If the main body 10 rotates in the counter-clockwise direction, it may be determined that a first cleaning cloth is not installed at the first rotary plate.

When change of coordinates for a traveling distance on X axis and Y axis and a rotation angle is repeated according to a predetermined pattern, the controller 110 may determine abnormal traveling. For example, the controller 110 determines an abnormal state when in-place rotation occurs repeatedly. In the case of abnormal traveling, the controller 110 may attempt to travel again after waiting for a predetermined period of time and may determine again whether it is abnormal traveling.

When the main body 10 rotates once and then travels straight forward, the controller may determine that the abnormal traveling is merely a temporary phenomenon and may determine the traveling state as a normal state. The controller 110 determines the traveling state as an abnormal state, and applies a control command to the driving unit 181 so that the main body 10 stops operating. Accordingly, the cleaner 180 stops operation of the motor and the water supply unit stop.

As described above, the controller 110 generates a warning for guiding impossibility of movement and requesting inspection, and outputs the warning through the output unit 119. In addition, the controller 110 may output guidance to mount a cleaning cloth. In addition, the controller 110 may transmit a warning to the terminal through the communication unit 130. The terminal 300 may output a warning in a manner of displaying the warning on a screen or generating warning sound or vibration.

Figure 9:
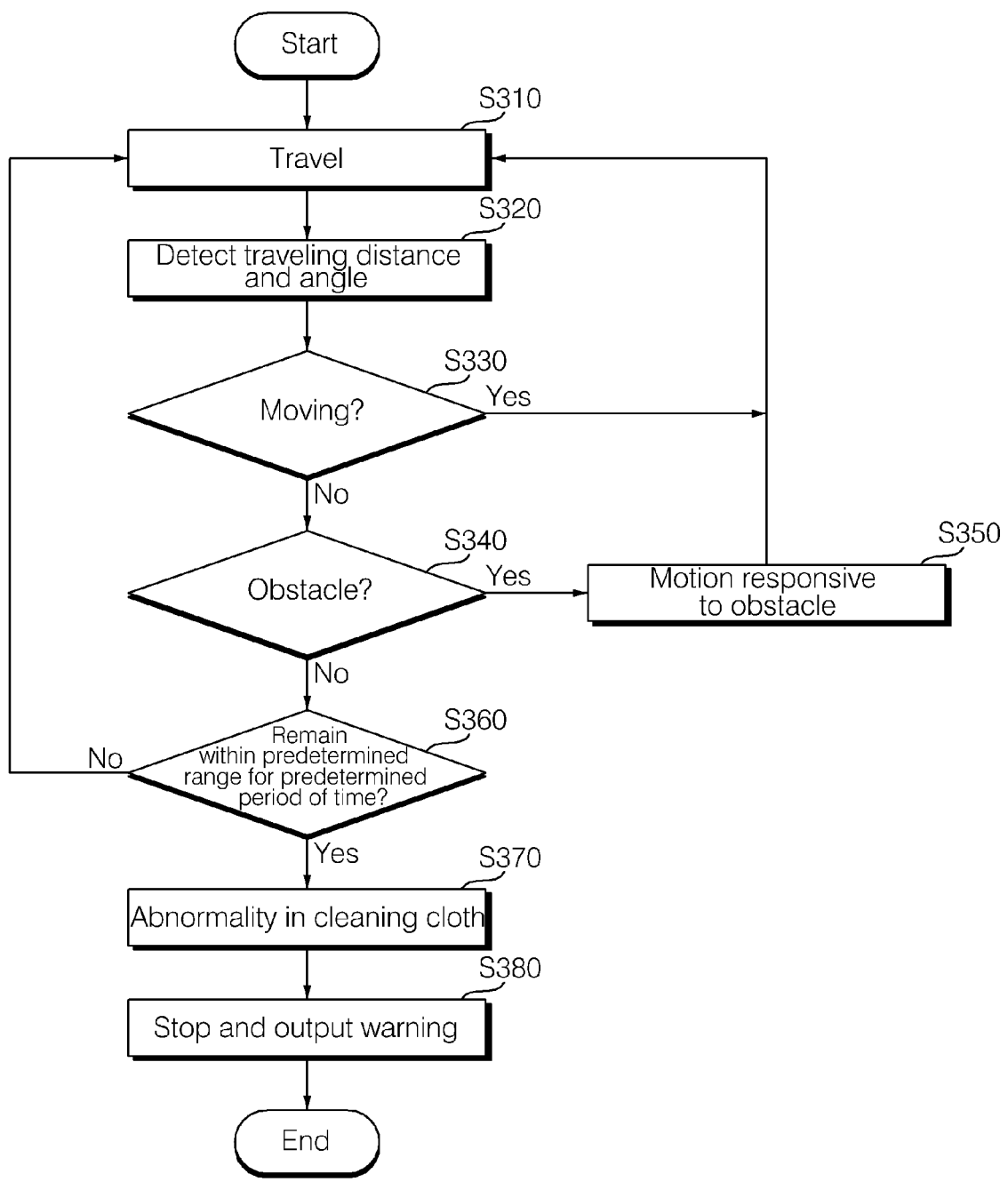
FIG. 9 is a flowchart illustrating a control method of a moving robot according to an embodiment of the present disclosure.

FIG. 9 is a flowchart illustrating a control method of a moving robot according to an embodiment of the present disclosure. As shown in FIG. 9, the moving robot 1 starts traveling according to a cleaning command in operation S310. The controller 110 applies a control command to the cleaner 180 through the travel controller 113 so that the main body 10 moves. The driving unit 181 drives the motor 182, and the first rotary plate 81 and the second rotary plate 82 are rotated by the motor, thereby moving the main body 10. The controller 110 determines whether the main body 10 moves based on a detected traveling distance and a detected angle (a rotation angle) in operation S320.

The traveling distance and the angle may be detected by sensors. For example, the angle may be measured by a gyro sensor and the traveling distance may be measured by a laser OFS. In addition, the controller 110 may analyze an image to calculate a traveling distance and an angle. The controller 110 analyzes a traveling distance and an angle (a rotation angle), and when the traveling distance and the angle is changed, the controller determines that the moving robot is moving.

The controller 110 determines whether an obstacle is detected through the obstacle detector 100 in operation S340, and when it is not allowed to move due to the presence of the obstacle, the controller performs a motion responsive to the obstacle in operation S350. The controller 110 determines whether the abnormality in traveling of the main body 10 is caused by the obstacle, and the controller performs an operation corresponding to the determination. The controller 110 continues traveling after avoiding the obstacle.

Meanwhile, when any obstacle is not detected and the moving robot does not move, the controller 110 may determine that there is an abnormality in the traveling state. In addition, the controller 110 may determine whether the traveling state is abnormal according to a current value of a motor. The controller 110 may determine whether the motor or the driving unit itself is abnormal according to a current value, and may determine an installation state of a cleaning cloth by determining a restrained state or a no-load state of the motor based on the current value. In some cases, the controller 110 may determine a floor state, that is, a floor material, based on the current value of the motor.

In addition, even in the case where there is a change in the location of the main body 10, if the location change occurs repeatedly within a predetermined range or the location is maintained within the predetermined range for a predetermined period of time or longer in operation S360, the controller 110 may determine there is an abnormality in the traveling state.

In an abnormal state, the controller 110 determines that the abnormality caused due to the absence of a cleaning cloth according to a travel range and a direction of travel in operation S370. As described above, when there is no movement, the controller 110 determines that the first and second cleaning cloths are not installed when there is no movement, and when a rotation angle is changed during traveling within a predetermined range, in-place rotation is determined and the controller may determine that any one of the cleaning cloths is not installed and thus may determine a cleaning cloth abnormality. The controller 110 stops operation and outputs a corresponding warning in operation S380.

The controller 110 applies a control command to the cleaner 180 to stop operation of the motor and the water supply unit. Accordingly, the motor stops operating, and the water supply unit stops water supply to the cleaning cloth. The controller 110 generates a warning to indicate impossibility of traveling and a cleaning cloth abnormality, and outputs the warning through the output unit 190. The warning may be output as a combination of at least one of a message, warning sound, warning light, and voice guidance. In addition, the controller 110 transmits a warning to the terminal 300 so that the warning is output through the terminal.

The moving robot according to an embodiment may be implemented in the form of an independent hardware device and may be driven in the form of being included in another hardware device such as a micro-processor or a general purpose computer system as at least one or more processors.

While the present disclosure has been described with reference to exemplary embodiments, it will be apparent to those skilled in the art that various changes and modifications may be made without departing from the spirit and scope of the present disclosure. Therefore, exemplary embodiments of the present disclosure are not limiting, but illustrative, and the spirit and scope of the present disclosure is not limited thereto.

What is claimed is:

1. A mobile robot, comprising:
    a main body configured to travel on a surface;
    a spin mop including a first rotary plate and a second rotary plate, wherein a first cleaning cloth is installed on the first rotary plate and a second cleaning cloth is installed on the second rotary plate; and
    a controller configured to (a) determine a traveling state of the mobile robot by calculating a location change of the main body during traveling, (b) determine whether the first rotary plate or the second rotary plate has a corresponding cleaning cloth installed thereon based on the determined traveling state, and (c) output a warning if it is determined that a cleaning cloth is not installed on the first rotary plate or the second rotary plate.

2. The mobile robot of claim 1, wherein the controller is configured to determine that a cleaning cloth is not installed on the first rotary plate or the second rotary plate when there is no location change of the main body for a predetermined period of time.

3. The mobile robot of claim 1, wherein the controller is configured to determine that a cleaning cloth is not installed on the first rotary plate or the second rotary plate when a rotation angle of the mobile robot changes within a predetermined range while moving for a predetermined period of time.

4. The mobile robot of claim 3, wherein the controller is configured to:
    determine that the second cleaning cloth is not installed on the second rotary plate when the main body rotates in a first direction by a rotation angle, and
    determine that the first cleaning cloth is not installed at the first rotary plate when the main body rotates in a second direction by a rotation angle, wherein the second direction is opposite the first direction.

5. The mobile robot of claim 1, wherein the controller is configured to:
   determine the location change of the main body by calculating coordinates based on a traveling distance on X axis and Y axis from a start point and a rotation angle, and
   determine that the main body is traveling normally when the determined location change falls within an error range.

6. The mobile robot of claim 5, wherein the controller is configured to:
   determine that there is an abnormality in the travel of the main body when the determined location change and a rotation angle of the mobile robot is repeated according to a predetermined pattern.

7. The mobile robot of claim 6, wherein the controller is configured to:
   reattempt to travel after waiting for a predetermined period of time when it is determined that there is an abnormality in the travel of the main body; and
   determine that a temporary error has occurred when the main body travels normally after the reattempt to travel.

8. The mobile robot of claim 1, wherein the controller is configured to:
   stop the travel of the main body when it is determined that a cleaning cloth is not installed on the first rotary plate or the second rotary plate.

9. The mobile robot of claim 1, further comprising an obstacle detector configured to detect an obstacle in a direction of travel of the mobile robot,
   wherein the controller is configured to determine whether the traveling state of the main body is abnormal due to any obstacle based on a detection result of the obstacle detector.

10. The mobile robot of claim 1, wherein the cleaner comprises:
   at least one motor configured to rotate the spin mop;
   a driving unit configured to control the motor such that the first and second rotary plates are rotated independently; and
   a water supply unit configured to supply water to at least one of the first cleaning cloth or the second cleaning cloth.

11. The mobile robot of claim 10, wherein the controller is configured to detect a current of the motor and determine a traveling state of the mobile robot for no load or restraint based on the detected current of the motor.

12. The mobile robot of claim 10, wherein the driving unit is configured to stop operation of the motor and stop water supply to at least one of the first cleaning cloth or the second cleaning cloth when it is determined that a cleaning cloth is not installed on the first rotary plate or the second rotary plate.

13. A method of controlling a mobile robot, the method comprising:
   spinning a spin mop of the mobile robot, wherein the spin mop comprises a first rotary plate with a first cleaning cloth installed thereon and a second rotary plate with a second cleaning cloth installed thereon;
   moving a main body of the mobile robot on a surface in response to the spinning of the spin mop, wherein the first cleaning cloth and the second cleaning cloth removes foreign substances from the surface during the moving; calculating a location of the main body;
   determining, via a controller of the mobile robot, a traveling state of the main body based on a change in the location of the main body;
   determining, via the controller, whether the first rotary plate or the second rotary plate has a corresponding cleaning cloth installed thereon when there is an abnormality in the moving of the main body; and
   outputting, via the controller, a warning when it is determined that a cleaning cloth is not installed on the first rotary plate or the second rotary plate.

14. The method of claim 13, further comprising:
   determining, via the controller, that a cleaning cloth is not installed on the first rotary plate or the second rotary plate when there is no change in the calculated location of the main body for a predetermined period of time; and
   determining, via the controller, that a cleaning cloth is not installed on the first rotary plate or the second rotary plate based on a rotation angle of the mobile robot.

15. The method of claim 14, further comprising:
   determining, via the controller, that the second cleaning cloth is not installed on the second rotary plate when the main body rotates in a first direction by a rotation angle; and
   determining, via the controller, that the first cleaning cloth is not installed on the first rotary plate when the main body rotates in a second direction opposite the first direction.

16. The method of claim 13, further comprising:
   determining, via the controller, that there is an abnormality in the moving of the main body when the calculated location of the main body is repeated according to a predetermined pattern, wherein the location of the main body is calculated based on coordinates that represent a distance of movement of the mobile robot on X axis and Y axis from a start point and a rotation angle.

17. The method of claim 16, further comprising:
   reattempting moving of the main body after waiting for a predetermined period of time when it is determined that there is an abnormality in the moving of the main body; and
   determining, via the controller, that a temporary error has occurred when the main body moves normally after the reattempting.

18. The method of claim 13, further comprising:
   stopping rotation of the first rotary plate and the second rotary plate when it is determined that a cleaning cloth is not installed on the first rotary plate or the second rotary plate.

19. The method of claim 13, further comprising:
   detecting an obstacle in a direction of movement of the mobile robot; and
   performing an action in response to the detection of the obstacle.

20. The method of claim 13, further comprising:
   detecting, via the controller, a current of a motor that rotates the first rotary plate and the second rotary plate; and
   determining, via the controller, a traveling state of the mobile robot for no load or restraint in response to the detected current of the motor.

* * * * *